(12) United States Patent
Shimura

(10) Patent No.: US 7,243,535 B2
(45) Date of Patent: Jul. 17, 2007

(54) TIRE MONITORING SYSTEM AND ITS MONITOR RECEIVER, MONITOR AND SENSOR

(75) Inventor: Kazuhiro Shimura, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 18 days.

(21) Appl. No.: 10/531,951

(22) PCT Filed: Oct. 8, 2003

(86) PCT No.: PCT/JP03/12900

§ 371 (c)(1),
(2), (4) Date: Apr. 19, 2005

(87) PCT Pub. No.: WO2004/038674

PCT Pub. Date: May 6, 2004

(65) Prior Publication Data

US 2006/0048567 A1    Mar. 9, 2006

(30) Foreign Application Priority Data

Oct. 22, 2002    (JP) .............................. 2002-307465

(51) Int. Cl.
*B60C 23/02* (2006.01)
(52) U.S. Cl. ........................ 73/146.5; 73/146
(58) Field of Classification Search .......... 73/700–756, 73/146–146.8
See application file for complete search history.

(56) References Cited

FOREIGN PATENT DOCUMENTS

| | | |
|---|---|---|
| EP | 1 187 346 A2 | 3/2002 |
| JP | 08-505939 A1 | 6/1996 |
| JP | 10-302187 A1 | 11/1998 |
| JP | 2000-142044 A1 | 5/2000 |
| JP | 2002-131165 A1 | 5/2002 |
| WO | WO-01/45967 A1 | 6/2001 |

OTHER PUBLICATIONS

PCT International Search Report for PCT/JP03/12900 mailed on Jan. 13, 2004.

*Primary Examiner*—Edward Lefkowitz
*Assistant Examiner*—Jermaine Jenkins
(74) *Attorney, Agent, or Firm*—Knobbe Martens Olson & Bear LLP

(57) ABSTRACT

The present invention provides a tire monitoring system, its monitor receiver, a monitor and a sensor for monitoring conditions of a tire even when a tire is replaced with another tire fixed with a sensor employing a transmission method different from that employed by a monitor. In other words, the present invention has a communication methods table listing more than two types of transmission method information for a data communication between a sensor 100 and a monitor 200 stored in a monitor 200 and enables to set a data communication with any transmission method selected from the transmission methods table available in a tire monitoring system including sensors 100, each of which is provided for each of the tires 300 equipped to a vehicle and wirelessly sends the detected results about conditions of tires 300, and a monitor 200 for monitoring conditions of each of said tires 300 by receiving the detected result sent from each of sensors 100.

51 Claims, 21 Drawing Sheets

Fig. 4

| SENSOR ID | COMMUNICATION PROTOCOL | DEMODULATION METHOD | TRANSFER BIT RATE | DATA FORMAT | FREQUENCY |
|---|---|---|---|---|---|
| AAxxxx | PROTOCOL1 | AM | RATE2 | FORMAT1 | f1 |
| ABxxxx | PROTOCOL2 | FM | RATE1 | FORMAT3 | f2 |
| ACxxxx | PROTOCOL3 | ASK | RATE3 | FORMAT5 | f3 |
| BAxxxx | PROTOCOL1 | PM | RATE1 | FORMAT2 | f4 |
| BBxxxx | PROTOCOL3 | PSK | RATE4 | FORMAT1 | f1 |
| BCxxxx | PROTOCOL3 | FSK | RATE5 | FORMAT4 | f5 |
| CAxxxx | PROTOCOL2 | AM | RATE1 | FORMAT1 | f6 |
| ... | ... | ... | ... | ... | ... |

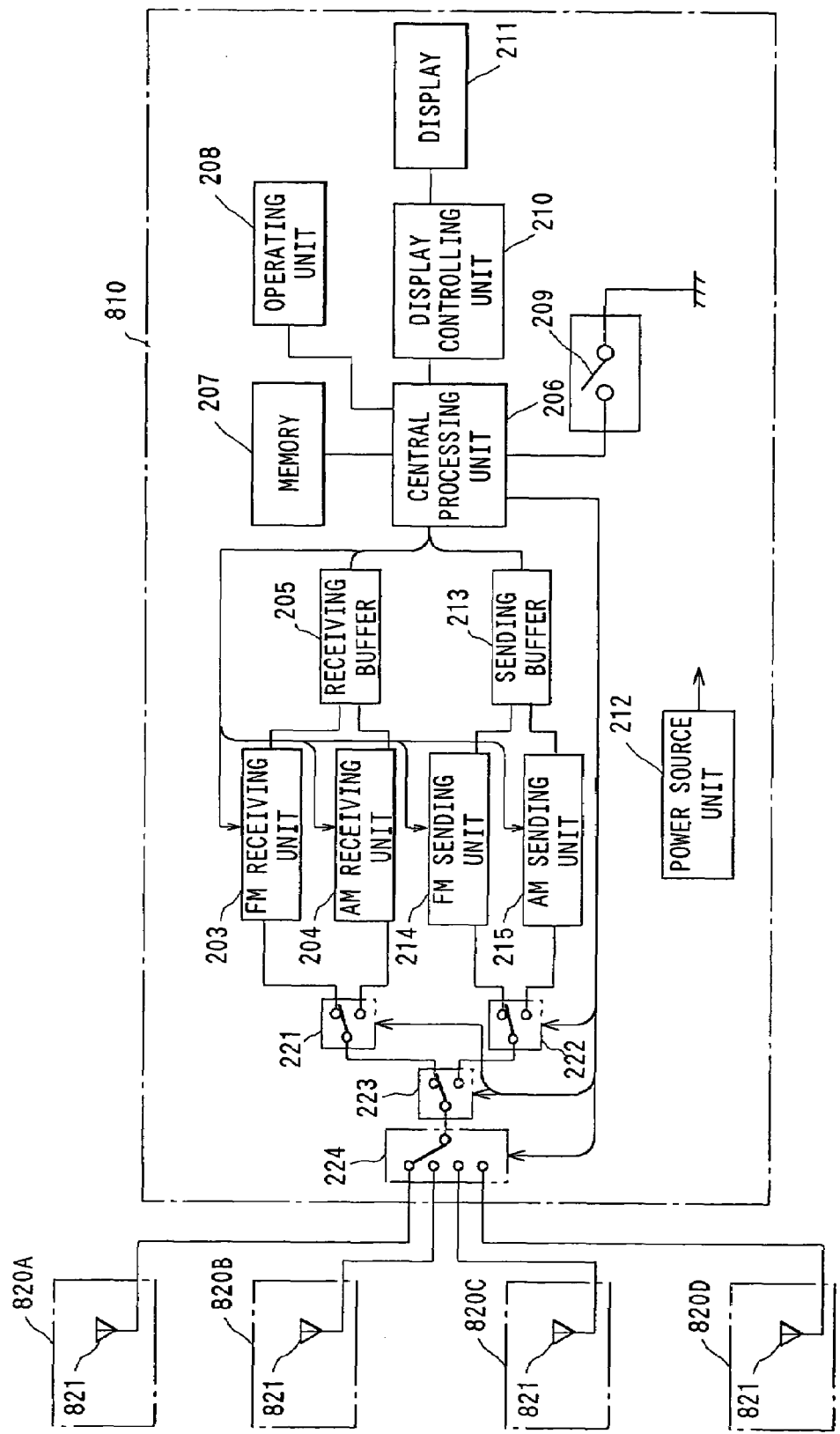

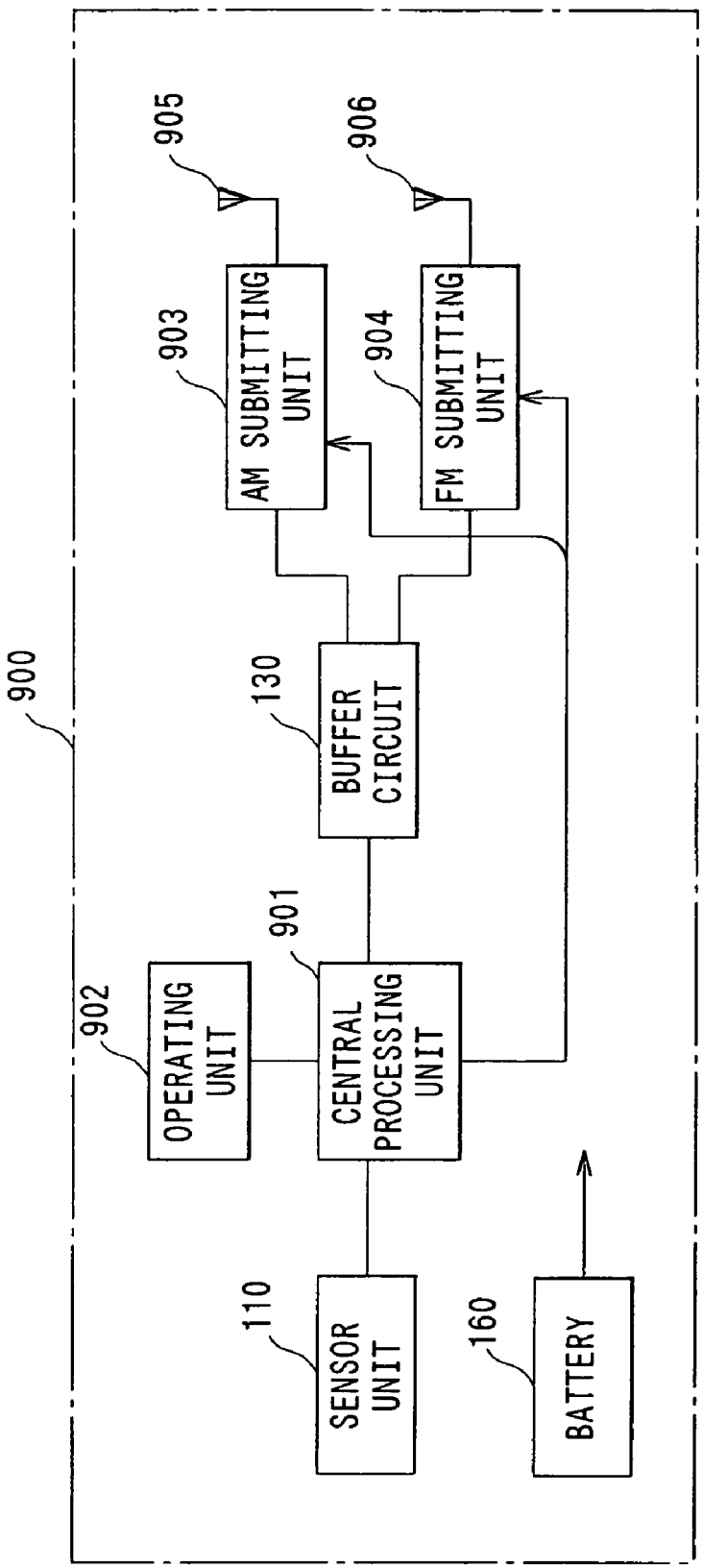

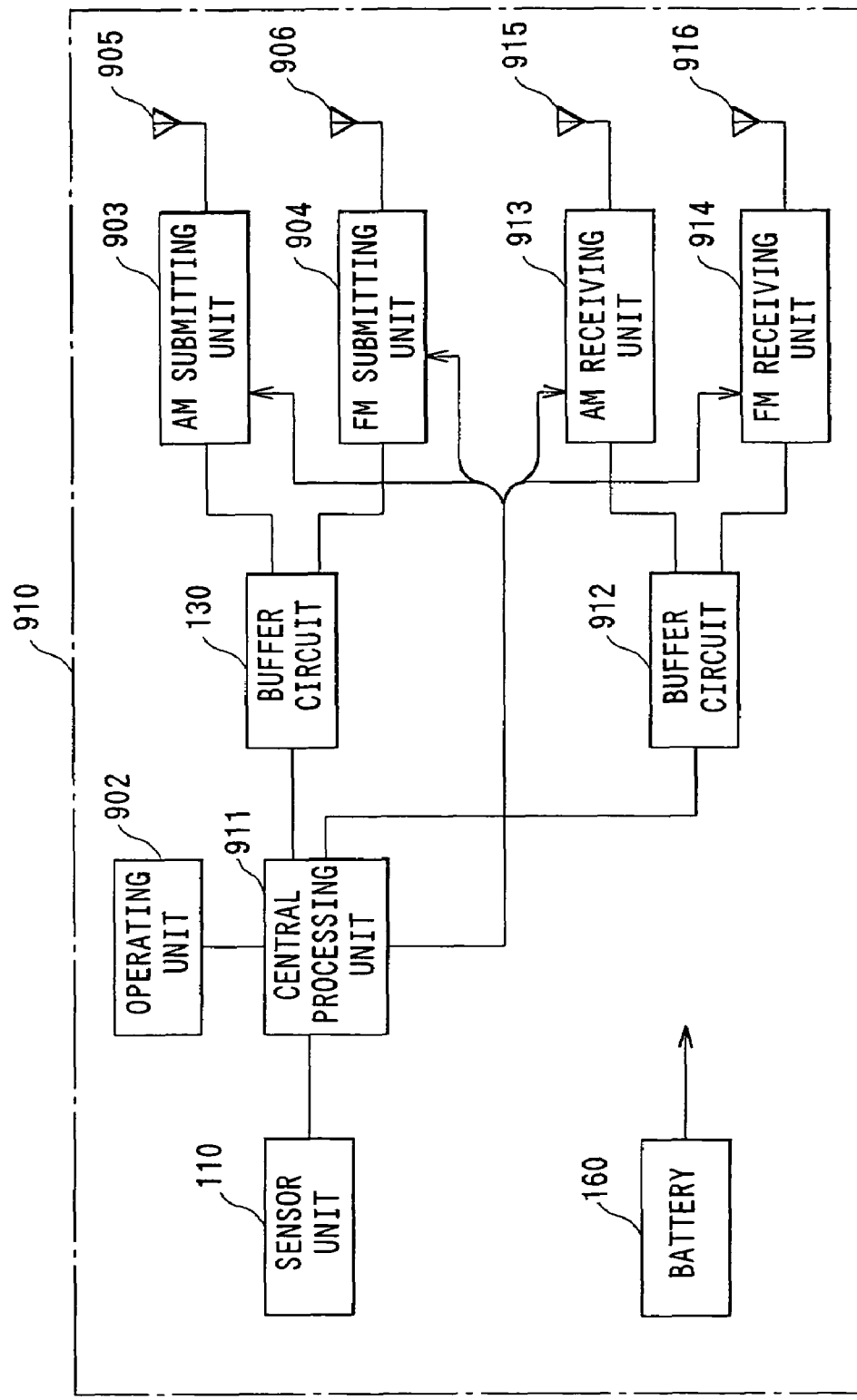

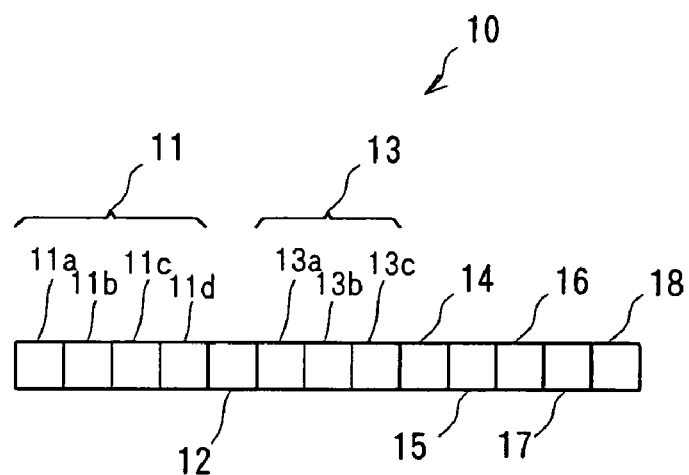
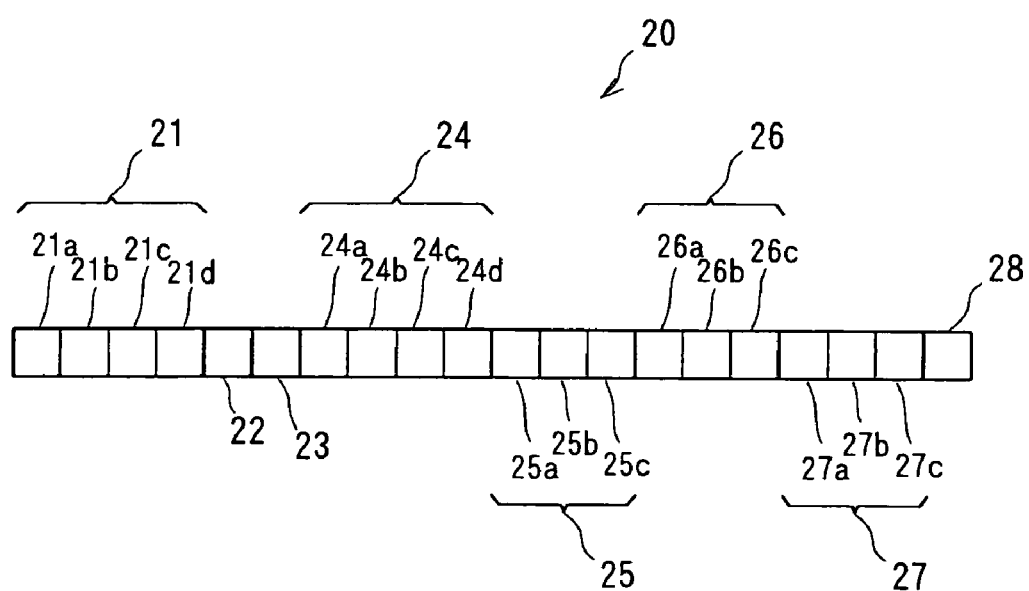

Fig. 22

| 1 | 2 | 4 | 8 |
|---|---|---|---|
| 1 | 0 | 1 | 0 |

LSB       MSB

| 8 | 4 | 2 | 1 |
|---|---|---|---|
| 1 | 0 | 1 | 0 |

MSB       LSB

= A (1 0)

TIRE MONITORING SYSTEM AND ITS MONITOR RECEIVER, MONITOR AND SENSOR

TECHNICAL FIELD

The present invention relates to a tire monitoring system and its monitor receiver, a monitor and a sensor for detecting conditions of tire including an air pressure.

BACKGROUND ART

Physical conditions of a tire including an air pressure in a tire have to be checked for safety traveling of a vehicle. It takes time and effort for a man to check tires. A tire monitoring system for automatically detecting physical conditions of a tire including an air pressure in a tire has been developed and become available for passenger vehicles.

The tire monitoring system includes a sensor generally fixed to a tire for detecting physical conditions of the tire and transmitting the detected result wirelessly, and a monitor for receiving the data sent from the sensor.

The sensor is generally provided inside a tire usually by being fixed to the rim of the tire or built in the tire.

A sensor with a function of storing historical information including manufacturing or repairing of a tire is also known. This type of sensor is usually built in a tire to avoid tampering of stored information.

A tire monitoring system that can be used for automating stability control in traveling of a vehicle has also been developed. In this tire monitoring system, a tire is provided with a sensor having a sensor unit for detecting physical conditions other than an air pressure, such as distortion, the number of revolutions, and rotation angle speed of a tire during the traveling.

"TREAD law (Transportation Recall Enhancement, Accountability and Document Act)" came into effect on November, 2000 in the United States, and "a partial amendment of Road Trucking Vehicle Law (amended Road Trucking Vehicle Law)" came into effect on July, 2002 in Japan.

The TREAD law stipulates outlines of a safe vehicle including more duty to inform a recall or more stringent penalties of negligence of the duty, more detailed items in a quality label of a tire, duty to be equipped with a tire air pressure alarm and improvement of child seats. To meet the duty to be equipped with a tire air pressure alarm stipulated by TREAD law, various manufacturers are manufacturing and selling sensors and tire monitoring systems.

The sensor disclosed in National Publication of International Patent Application No. 8-505939 is known as a conventional example of sensor.

The remote tire pressure monitoring system disclosed in National Publication of International Patent Application No. 8-505939 is a system for displaying a low tire pressure in a vehicle, wherein each tire has a transmitter with its own code, and wherein a central receiver in the vehicle identifies a code of each transmitter. The system is revised so that it restudies the position of a transmitter when a tire is changed while a vehicle is on the way to a destination or getting serviced. When an ASIC encoder in each transmitter is manufactured, it is programmed to send the information with different periods according to its own code in order to avoid crashing wireless frequencies between more than two transmitters on a vehicle.

However, as tire monitoring systems have not had a unified technical standard, the specification of the system varies among manufacturers.

For example, an identification code of a transmitter is 12 bits, 20 bits or 24 bits in conventional systems. For a different identification code, a receiving process at the receiving side also differs.

As another example, a format of transmitted data also varies among manufacturers as shown in FIGS. 20 and 21. Transmitted data 10 in a sensor from company A shown in FIG. 20 includes binary 13 bits including header information 11 consisting of four bits 11a-11d, equipment code 12 consisting of one bit, identification code 13 consisting of three bits 13a-13c, air pressure information 14 consisting of one bit, temperature information 15 consisting of one bit, battery voltage information 16 consisting of one bit, status information 17 consisting of one bit, and control code 18 consisting of one bit.

Transmitted data 20 in a sensor from company B shown in FIG. 21 includes binary 20 bits including header information 21 consisting of four bits 21a-21d, a control code 22 consisting of one bit, an equipment code 23 consisting of one bit, an identification code 24 consisting of four bits 24a-24d, air pressure information 25 consisting of three bits 25a-25c, temperature information 26 consisting of three bits 26a-26c, battery voltage information 27 consisting of three bits 27a-27c, and status information 28 consisting of one bit.

Positions of LSB and MSB may reverse in multiple bits of data of arbitrary information for some manufacturers.

For example, as shown in FIG. 22, the top bit of four bits binary data is LSB and the fourth bit from the top represents MSB in transmitted data employed by company C. In this case, when binary data is "1010", its hexadecimal value is "5".

On the other hand, as shown in FIG. 23, the top bit of four bits binary data is MSB and the fourth bit from the top represents LSB in transmitted data employed by company D. In this case, when binary data is "1010", its hexadecimal value is "A (decimal value: 10)".

Moreover, the different modulation method is used when the transmission involves radio waves.

A transmission method between a sensor and a monitor varies among manufacturers as stated above. This made a problem when a tire is replaced with another tire embedded with a sensor from a manufacturer different from that embedded in the first tire in such a case as a flat tire. The sensor in the tire to be used is unable to communicate with a monitor used to communicate till then. This required replacement of the entire system.

In view of the above problem, the object of the present invention is to provide a tire monitoring system, its monitor receiver, a monitor and a sensor for monitoring conditions of a tire even when a tire is replaced with another tire fixed with a sensor employing a transmission method different from that employed by a monitor.

DISCLOSURE OF THE INVENTION

In order to achieve the abovementioned object, the present invention provides a tire monitoring system including sensors, each of which is provided for each of the tires equipped to a vehicle and detects conditions of the tire and wirelessly sends the detected result, and a monitor with a monitor receiver, which receives the detected result sent from each of said sensors, for monitoring conditions of each of said tires on the basis of said detected result received by the monitor receiver; wherein at least either said sensor or said monitor includes: a storage unit for storing more than two types of transmission method information for a data communication between said sensor and said monitor; and switch means for selecting one type of transmission method information from said stored transmission method information and setting a data communication with a transmission method on the basis of the selected transmission method information available.

The tire monitoring system according to the present invention has a storage unit and switch means provided with either or both of the sensors and the monitor. The switch means enables the same transmission method to be set for sensors and a monitor. In other words, in the present invention, the switch means selects a transmission method from multiple types of transmission methods stored in the storage unit and sets a data communication with this transmission method available. At the monitor, the switch means switches a transmission method to what is common to all the sensors fixed to respective tires or to a transmission method individually for each sensor.

The present invention provides the abovementioned tire monitoring system, including means for carrying out a data communication by using radio waves between said sensors and said monitor, wherein said switch means has means for switching frequencies of radio waves used in said data communication.

The tire monitoring system according to the present invention carries out a data communication by using radio waves between sensors and a monitor, wherein a switch means can switch frequencies of radio waves used in a data communication. This enables a data communication to be carried out after replacement of a tire in the same way as before the replacement even if a tire is replaced with another tire fixed with a sensor using a transmission frequency different from that used in the sensor fixed to the tire before the replacement.

The present invention provides the abovementioned tire monitoring system, wherein said transmission method information includes at least one type of information of communication protocol information, modulation method information, and demodulation method information.

As the tire monitoring system according the present invention includes at least one type of information of communication protocol information, modulation method information, and demodulation method information as said transmission method information, it can switch transmission methods on the basis of these types of information. For example, when the tire monitoring system has information on communication protocols as communication protocol information, information on modulation methods as modulation method information, and information on demodulation methods as demodulation method information, it can set multiple transmission methods by combining them. If the tire monitoring system requires no modulation method information or no demodulation method information, it needs not store the unnecessary information.

The present invention provides the abovementioned tire monitoring system, wherein said transmission method information includes data transfer bit rate information and transferred data format information.

As the tire monitoring system according to the present invention includes data transfer bit rate information and transferred data format information as said transmission method information, it can respond to a situation and establish a data communication even if data transfer bit rate or a transferred data format changes.

The present invention provides the abovementioned tire monitoring system, wherein said monitor is provided inside said vehicle.

In the tire monitoring system according to the present invention, a monitor provided inside a vehicle carries out a data communication with a sensor in each tire and detects conditions of each tire.

The present invention provides the abovementioned tire monitoring system, wherein said sensor includes means for detecting an air pressure in a tire and sending the detected result.

In the tire monitoring system according to the present invention, a sensor in each tire detects an air pressure in the tire and sends the detected result to a monitor.

In order to achieve the abovementioned object, the present invention provides a monitor receiver in a tire monitoring system including sensors, each of which is provided for each of the tires equipped to a vehicle and detects conditions of the tire and wirelessly sends the detected result, and a monitor with said monitor receiver, which receives the detected result sent from each of said sensors, for monitoring conditions of said tires on the basis of said detected result received by the monitor receiver; wherein said monitor receiver includes:

a storage unit for storing more than two types of transmission method information for a data communication with said sensors; and switch means for selecting one type of transmission method information from said stored transmission method information and setting a data communication with a transmission method on the basis of the selected transmission method information available.

The monitor receiver in the tire monitoring system according to the present invention is provided with a storage unit and switch means. The switch means can set a transmission method for receiving data sent from a sensor. In other words, in the present invention, switch means selects a transmission method from multiple types of transmission methods stored in the storage unit and sets the transmission method to be used for receiving data sent from a sensor. In the monitor receiver, the switch means switches a transmission method to what is common to all the sensors fixed to respective tires or to a transmission method individually for each sensor.

The present invention provides the monitor receiver in the abovementioned tire monitoring system, including means for carrying out a data communication by using radio waves with said sensors, wherein said switch means has means for switching frequencies of radio waves used in said data communication.

The monitor receiver in the tire monitoring system according to the present invention receives data including a detected result sent from a sensor by using radio waves. On receiving the data, the switch means can switch frequencies of radio waves to be used in a data communication. This enables data to be received after replacement of a tire in the same way as before the replacement even if a tire is replaced with another tire fixed with a sensor using a transmission frequency different from that used in the sensor fixed to the tire before the replacement.

The present invention provides the monitor receiver in the abovementioned tire monitoring system, wherein said transmission method information includes at least either communication protocol information or demodulation method information.

As the monitor receiver in the tire monitoring system according the present invention includes at least either of communication protocol information and demodulation method information for said transmission method information, it can switch transmission methods on the basis of these types of information. For example, when the tire monitoring system has information on communication protocols as communication protocol information and information on demodulation methods as demodulation method information, it can set multiple transmission methods by combining them.

The present invention provides the monitor receiver in the abovementioned tire monitoring system, wherein said transmission method information includes data transfer bit rate information and transferred data format information.

As the monitor of the tire monitoring system according to the present invention includes data transfer bit rate information and transferred data format information as said transmission method information, it can respond to a situation and receive data sent from a sensor even if data transfer bit rate or a transferred data format changes.

The present invention provides the monitor receiver in the abovementioned tire monitoring system, wherein said switch means includes means for selecting one type of transmission method information from said more than two types of transmission method information and setting a data communication with a transmission method based on the selected transmission method information available, individually for each of the sensors.

In the monitor receiver in the tire monitoring system according to the present invention, said switch means can set a transmission method individually for each sensor. In other words, the switch means selects one type of transmission method information from said more than two types of transmission method information individually for each of the sensors and sets a data communication with a transmission method based on the selected transmission method information available individually for each of the sensors.

The present invention provides the monitor receiver in the tire monitoring system including communication means for carrying out a data communication in a time sharing method with each of said sensors, wherein said switch means includes means for setting one of said transmission methods available individually for a transmission time for each of said time-sharing sensors.

The monitor receiver in the tire monitoring system according to the present invention receives data sent from each sensor in time sharing method and sets one of said transmission methods available individually for a transmission time for each of said time-sharing sensors.

The present invention provides the monitor receiver in the abovementioned tire monitoring system;
wherein said switch means includes:
a control unit for setting a data communication with a transmission method on the basis of transmission method information stored in said storage unit available;
means for receiving data sent from said sensor with any of more than two types of demodulation methods on the basis of an instruction from said control unit; and
a switch for switching said control unit to the default state when a sensor is changed,
wherein said control unit includes means for receiving data sent from said sensor by switching said more than two demodulation methods one after the other in said default state and for setting a transmission method available by automatically determining a transmission method corresponding to said sensor on the basis of predetermined information in the received data.

In the monitor receiver in the tire monitoring system according to the present invention, a data communication with a transmission method on the basis of transmission method information stored in said storage unit by a control unit is set available, and data sent from said sensor with any of more than two demodulation methods is received on the basis of an instruction from said control unit. In addition, when said control unit is switched to the default state by said switch after a sensor is changed, data sent from a sensor is received by switching more than two demodulation methods one after the other by said control unit and an available transmission method is determined by automatically determining a transmission method corresponding to said sensor on the basis of predetermined information in the received data.

Therefore, if a tire is changed with another tire with different sensor, a data communication is established with a transmission method with a sensor being automatically selected only by switching a control unit to the default state by said switch.

The present invention provides the monitor receiver in the abovementioned tire monitoring system, wherein said storage unit stores information representing the type of a sensor and transmission method information in sensor's own identification information sent by the sensor in association with each other, wherein said control unit has means for automatically determining a transmission method corresponding to said sensor on the basis of sensor's identification information included in data received from said sensor.

In the monitor receiver in the tire monitoring system according to the present invention, a control unit automatically determines a transmission method corresponding to a sensor on the basis of sensor's identification information included in data received from the sensor.

The present invention provides the monitor receiver in the abovementioned tire monitoring system, including at least two or more of amplitude modulation (AM), amplitude shift keying (ASK), frequency modulation (FM), frequency shift keying (FSK), phase modulation (PM) and phase shift keying (PSK) as said demodulation method.

The monitor receiver in the tire monitoring system according to the present invention can carry out demodulation in association with each of at least two or more of modulation methods of radio waves modulated by using amplitude modulation (AM), amplitude shift keying (ASK), frequency modulation (FM), frequency shift keying (FSK), phase modulation (PM) and phase shift keying (PSK) as said demodulation method.

The present invention provides the monitor receiver in the abovementioned tire monitoring system including means for displaying at least a part of data received from said sensor.

The monitor receiver in the tire monitoring system according to the present invention can display at least a part of data received from a sensor.

In order to achieve the abovementioned object, the present invention provides a monitor of a tire monitoring system including sensors, each of which is provided for each of the tires equipped to a vehicle and detects conditions of the tire and wirelessly sends the detected result, and a monitor with a monitor receiver, which receives the detected result sent from each of said sensors, for monitoring conditions of said tires on the basis of said detected result received by the monitor receiver, wherein said monitor includes any of said monitor receivers.

As the monitor of the tire monitoring system according to the present invention includes said monitor receiver, it can switch transmission methods for receiving data sent from a sensor. At the monitor receiver, the switch means switches a transmission method to what is common to all the sensors fixed to respective tires or to a transmission method individually for each sensor.

The present invention provides the monitor of the abovementioned tire monitoring system including means for requesting from said sensor to send said detected result.

In the monitor of the tire monitoring system according to the present invention, a sensor always sends a detected result when the sensor is required to send the detected result.

In order to achieve the abovementioned object, the present invention provides a sensor of a tire monitoring system including sensors, each of which is provided for each of the tires equipped to a vehicle and detects conditions of the tire and wirelessly sends the detected result, and a monitor with a monitor receiver, which receives the detected result sent from each of said sensors, for monitoring conditions of said tires on the basis of said detected result received by the monitor receiver, wherein said sensors includes:

a storage unit for storing more than two types of transmission method information for a data communication with said monitor; and switch means for selecting one type of transmission method information from transmission method information stored in said storage unit and setting a data communication with a transmission method on the basis of the selected transmission method information available.

The sensors of the tire monitoring system according to the present invention are provided with a storage unit and switch means. The switch means can set a transmission method for sending data from a sensor. In other words, in the present invention, the switch means selects a transmission method from multiple types of transmission methods stored in the storage unit and sets so that data including a detected result can be sent by using this transmission method.

The present invention provides a sensor of the abovementioned tire monitoring system including means for carrying out a data communication with said monitor by using radio waves.

The sensor of the tire monitoring system according to the present invention sends data including a detected result by using radio waves. In sending this data, switch means can switch frequencies of radio waves used in the data communication. This enables a data transfer to be carried out after replacement of a tire in the same way as before the replacement even if the sensor is used for a vehicle equipped with a monitor using a different frequency as a transmission frequency.

The present invention provides the sensor of the abovementioned tire monitoring system, wherein said transmission method information includes at least either communication protocol information or modulation method information.

As the sensor of the tire monitoring system according to the present invention includes at least either communication protocol information or modulation method information as said transmission method information, transmission methods can be switched on the basis of the information. For example, when the sensor of the tire monitoring system has information on communication protocols as communication protocol information and information on modulation methods as modulation method information, it can set multiple transmission methods by combining them.

The present invention provides the sensor of the abovementioned tire monitoring system, wherein said transmission method information includes data transfer bit rate information and transferred data format information.

As the sensor of the tire monitoring system according to the present invention includes data transfer bit rate information and transferred data format information as said transmission method information, it can respond to changing of data transfer bit rate or a transferred data format.

The present invention provides the sensor of the abovementioned tire monitoring system including means for detecting an air pressure in a tire and sending the detected result.

The sensor of the tire monitoring system according to the present invention detects an air pressure in a tire and sends data including the detected result to a monitor.

BRIEF DESCRIPTION OF THE DRAWINGS

FIG. 4 is a diagram showing a transmission methods table stored in a monitor of the first embodiment according to the present invention;

FIG. 17 is a block diagram illustrating an electric circuit of a monitor of the fifth embodiment according to the present invention;

FIG. 18 is a block diagram illustrating an electric circuit of a sensor of the sixth embodiment according to the present invention;

FIG. 19 is a block diagram illustrating an electric circuit of a sensor of the seventh embodiment according to the present invention;

FIG. 20 is a diagram showing an example of a transmitted data format in a conventional example;

FIG. 21 is a diagram showing an example of a transmitted data format in a conventional example;

FIG. 22 is a diagram showing an example of transmitted data in a conventional example; and FIG. 23 is a diagram showing an example of transmitted data in a conventional example.

BEST MODE FOR CARRYING OUT THE INVENTION

The first embodiment according to the present invention will be described with reference to figures.

Figure 1:
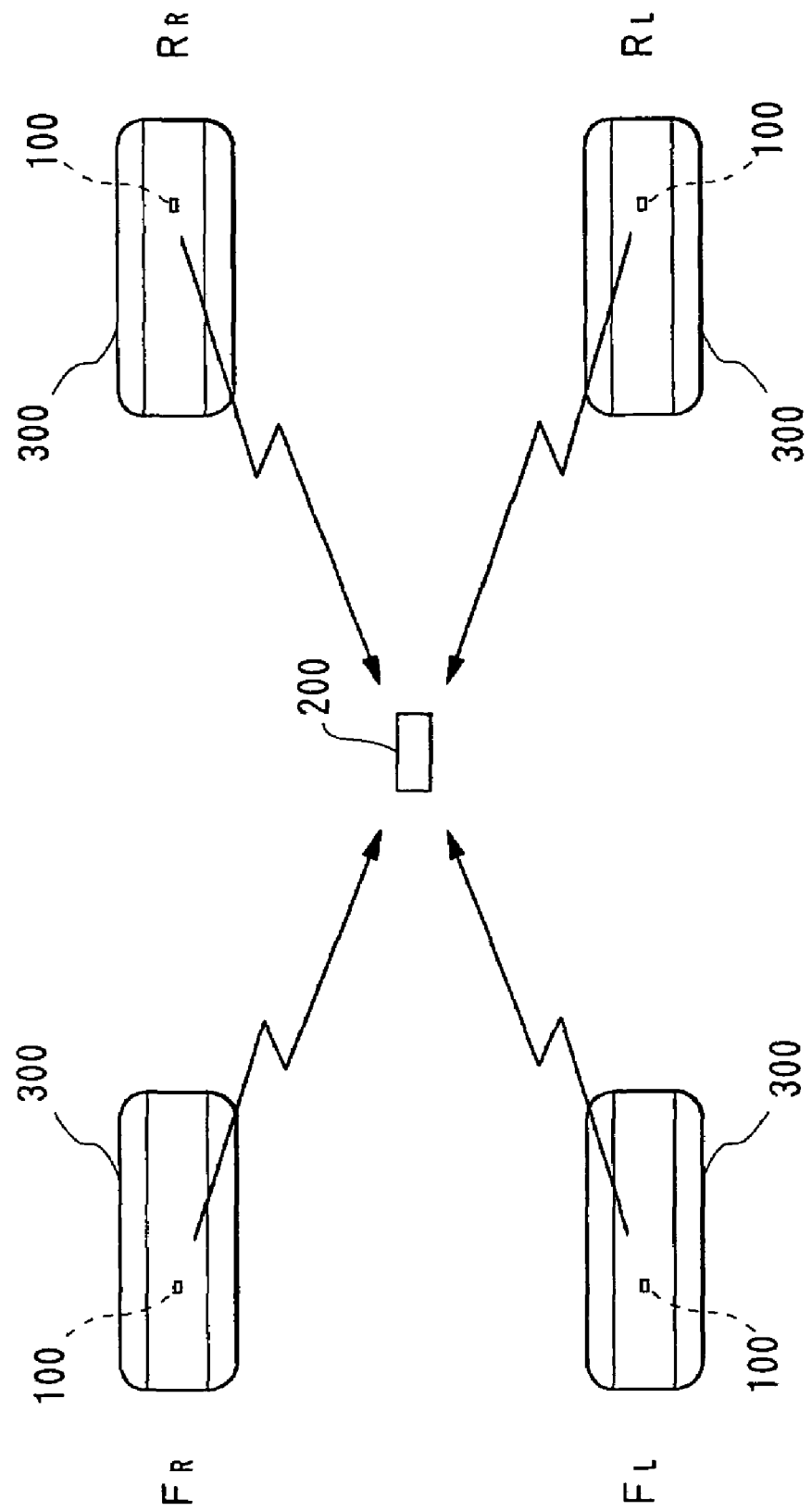
FIG. 1 is a block diagram illustrating a tire monitoring system of the first embodiment according to the present invention.
Figure 2:
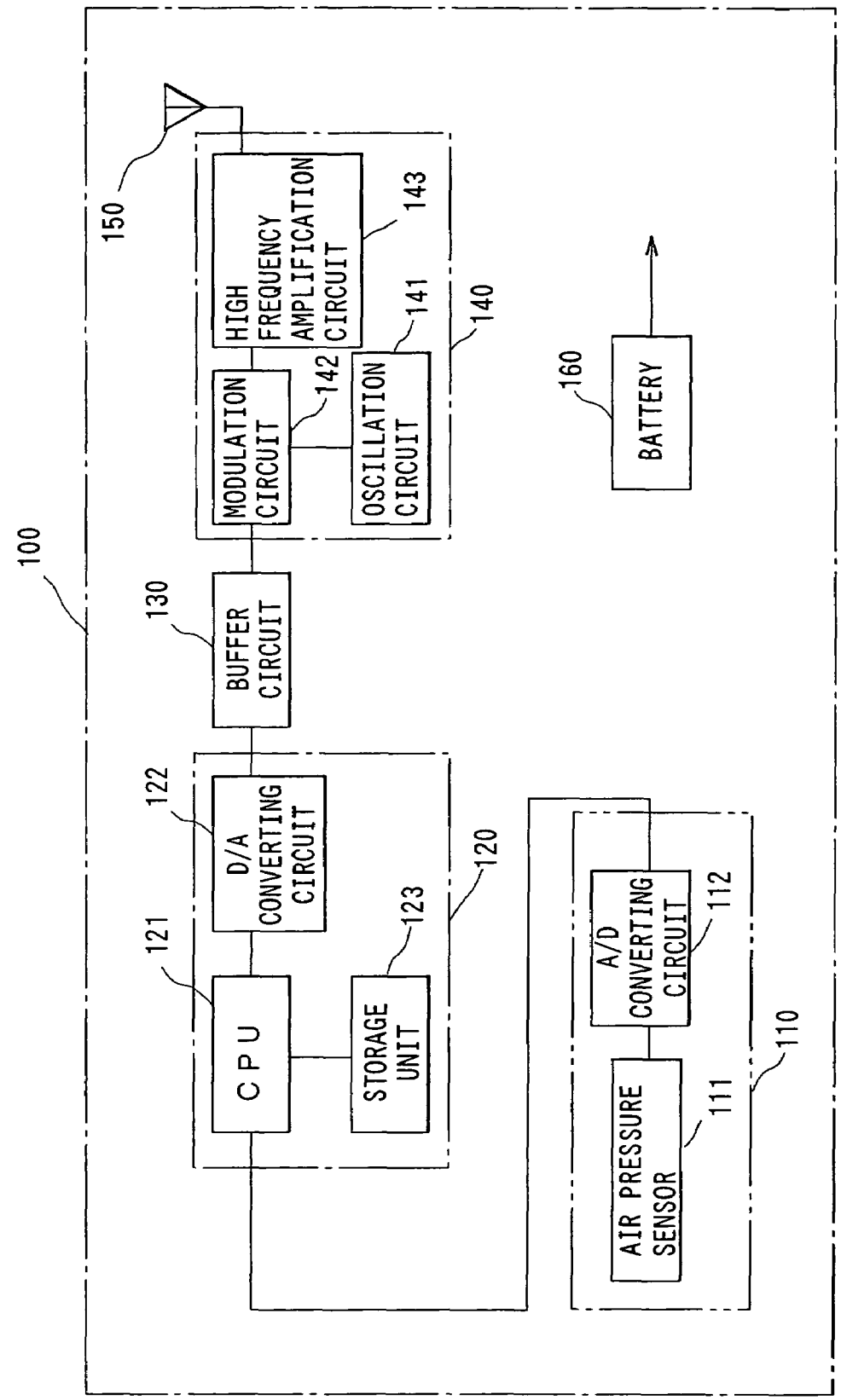
FIG. 2 is a block diagram illustrating an electric circuit of a sensor of the first embodiment according to the present invention.
Figure 3:
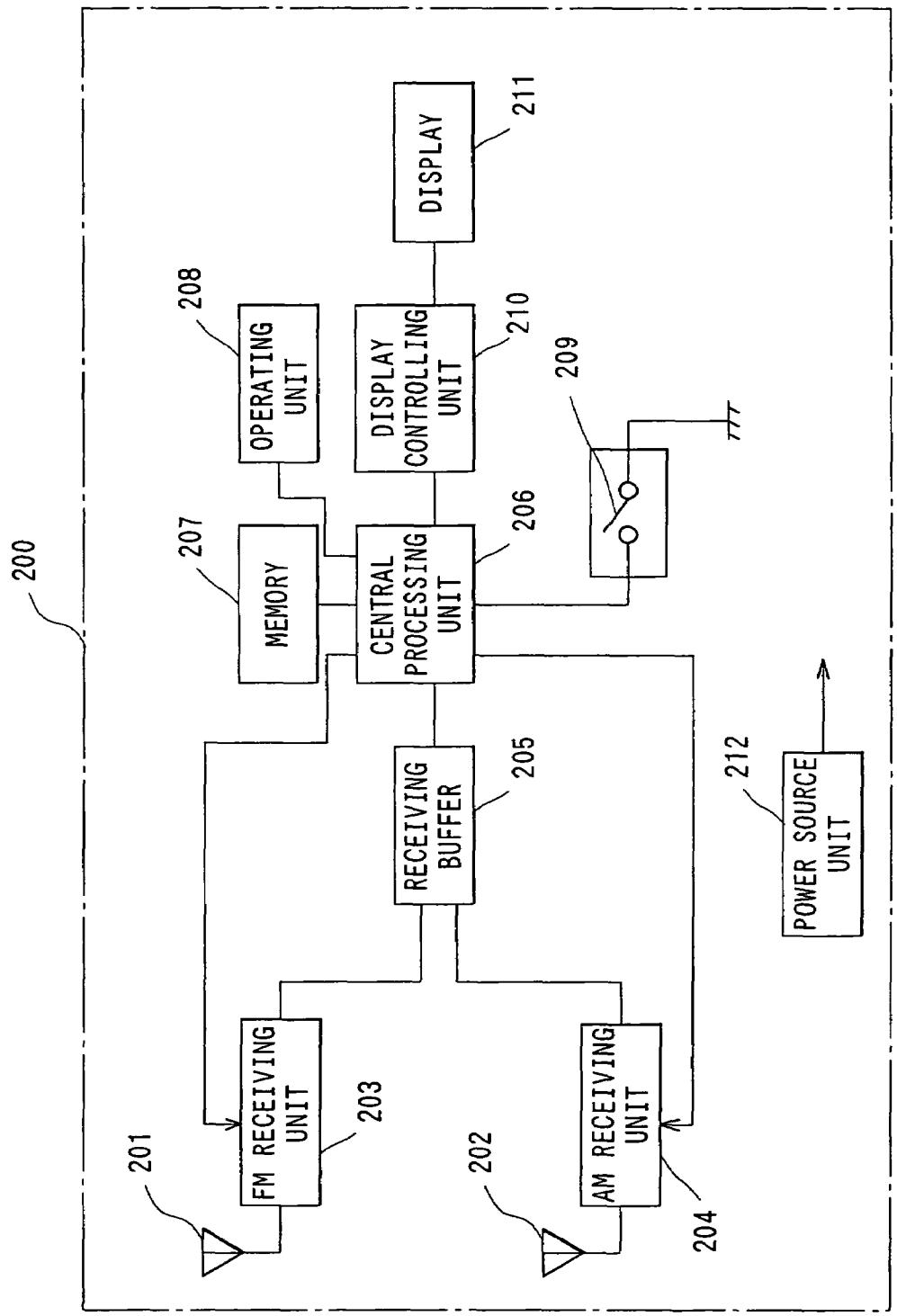
FIG. 3 is a block diagram illustrating an electric circuit of a monitor of the first embodiment according to the present invention.

FIG. 1 is a block diagram illustrating a tire monitoring system of the first embodiment according to the present invention. FIG. 2 is a block diagram illustrating an electric circuit of a sensor of the first embodiment according to the present invention. FIG. 3 is a block diagram illustrating an electric circuit of a monitor of the first embodiment according to the present invention.

In the figures, the reference number 100 denotes a sensor, 200 denotes a monitor, and 300 denotes a tire equipped to a vehicle.

A sensor 100 is provided inside a tire 300, detects the air pressure in the tire 300 and wirelessly sends the detected result to a monitor 200.

As shown in FIG. 2, an electric circuit of the sensor 100 includes a sensor unit 110, a central processing unit 120, a buffer circuit 130, an oscillation unit 140, an antenna 150 and a battery 160.

The sensor unit 110 includes an air pressure sensor 111 and an A/D converting circuit 112.

The air pressure sensor 111 detects a pressure of air filling up the tire 300 and outputs this detected result in an analog electronic signal. As the air pressure sensor 111, a commercially available device can be used.

The A/D converting circuit 112 converts the analog electric signal output from the air pressure sensor 111 into a digital signal and outputs the digital signal to a CPU 121. The digital signal corresponds to a value of the air pressure in a tire 300.

The central processing unit 120 includes a known CPU 121, a digital/analog (hereinafter referred to D/A) converting circuit 122 and a storage unit 123.

The CPU 121 operates based on a program stored in semiconductor memory of the storage unit 123. When the CPU 121 is supplied with electric energy and driven, it sends sensed data from the sensor unit 110 to the monitor 200 at every predetermined time (for example, five minutes). The storage unit 123 previously stores identification information specific to the sensor 100. The CPU 121 sends this identification information to the monitor 200 along with the sensed data.

The storage unit 123 includes ROM recording a program for operating CPU 121 and electrically erasable programmable nonvolatile semiconductor memory such as EEPROM (electrically erasable programmable read-only memory). The storage unit 123 previously stores identification information specific to each sensor 100 (hereinafter referred to sensor ID) in the region specified as non-erasable in the storage unit 123 when it is manufactured.

The buffer circuit 130 includes a memory circuit using FIFO or the like. The buffer circuit 130 temporally accumulates binary serial sent data output from the D/A converting circuit 122 and outputs it to the oscillation unit 140.

The oscillation unit 140 includes an oscillation circuit 141, a modulation circuit 142 and a high frequency amplification circuit 143. The oscillation unit 140 modulates carrier waves oscillated at the oscillation circuit 141 formed by a known PLL circuit or the like, for example, carrier waves of a frequency in 315 MHz band, at the modulation circuit 142 on the basis of sent data input from the buffer circuit 130, and supplies them as a high frequency current of a frequency in 315 MHz band to an antenna 150 via the high frequency amplification circuit 143.

The Modulation circuit 142 amplitude-modulates (AM) carrier waves on the basis of sent data input from the buffer circuit 130 and outputs them to the high frequency amplification circuit 143.

Although said frequency is set to frequency in 315 MHz band in this embodiment, the frequency may be different from this. The modulation method in the modulation circuit 142 is not limited to amplitude-modulation (AM), and other modulation methods including amplitude shift keying (ASK), frequency modulation (FM), frequency shift keying (FSK), phase modulation (PM) and phase shift keying (PSK) may be used.

The antenna 150 is for communicating with the monitor 200 using radio waves. The antenna 150 is adjusted to a predetermined frequency in 315 MHz band in this embodiment.

The battery 160 includes secondary battery or the like, and supplies electric energy necessary to drive the sensor 100 to each unit.

If a sensor 100 is embedded in a tire 300 when the tire 300 is manufactured, it is needless to say that an IC chip or other components are designed so as to bear the heat of vulcanization.

The monitor 200 is placed near the driver seat of a vehicle. The monitor 200 includes antennas 201, 202, an FM receiving unit 203, an AM receiving unit 204, a receiving buffer 205, a central processing unit 206, memory 207, an operating unit 208, a switch 209, a display controlling unit 210, a display 211, and a power source unit 212.

In the first embodiment, a monitor receiver according to the present invention includes the abovementioned antennas 201, 202, FM receiving unit 203, AM receiving unit 204, receiving buffer 205, central processing unit 206, memory 207, operating unit 208, switch 209 and power source 212.

The antennas 201, 202 are adjusted to the same frequency as the sending frequency of the sensor 100. The antenna 201 is connected to an input side of the FM receiving unit 203 and the antenna 202 is connected to an input side of the AM receiving unit 204.

The FM receiving unit 203 receives radio waves of a predetermined frequency that went through frequency modulation (FM) or frequency shift keying (FSK) via the antenna 201, demodulates the received signal into binary serial digital data, and outputs the received data to the receiving buffer 205. The FM receiving unit 203 switches demodulation methods, i.e., switches between receiving radio waves which went through frequency modulation (FM) or receiving radio waves which went through frequency shift keying (FSK), on the basis of a control signal from the central processing unit 206. The FM receiving unit 203 can scan a predetermined range of a receiving frequency on the basis of a control signal from the central processing unit 206 and lock a receiving frequency to any frequency within a predetermined range. It is needless to say that frequencies in 315 MHz band are included as a receivable frequency band in the FM receiving unit 203.

The AM receiving unit 204 receives radio waves of a predetermined frequency that went through amplitude modulation (AM) or amplitude shift keying (ASK) via the antenna 202, demodulates the received signal into binary serial digital data, and outputs the received data to the receiving buffer 205. The AM receiving unit 204 switches demodulation methods, i.e., switches between receiving radio waves which went through amplitude modulation (AM) or receiving radio waves which went through amplitude shift keying (ASK), on the basis of a control signal from the central processing unit 206. The AM receiving unit 204 can scan a predetermined range of a receiving frequency on the basis of a control signal from the central processing unit 206 and lock a received frequency to any frequency within a predetermined range. It is needless to say that frequencies in 315 MHz band are included as a receivable frequency band in the AM receiving unit 204.

The receiving buffer 205 temporally stores serial digital data output from the FM receiving unit 203 and the AM receiving unit 204, and outputs the data to the central processing unit 206 according to an instruction from the central processing unit 206.

A main component of the central processing unit 206 is a known CPU. The central processing unit 206 operates on the basis of a program stored in the memory 207. When the central processing unit 206 is supplied with electric energy and driven, it analyzes sensed data received from the sensor 100 and displays it on the display 211 via the display controlling unit 210.

The central processing unit 206 inputs information or signals from the operating unit 208 and the switch 209, initializes the transmission method with the sensor 100, and communicates with each sensor 100 with the initialized transmission method.

The memory 207 includes ROM recording a program for operating a CPU in the central processing unit 206 and electrically erasable programmable nonvolatile semiconductor memory such as EEPROM (electrically erasable programmable read-only memory). When the erasable programmable semiconductor memory is manufactured, it stores a transmission methods table as shown in FIG. 4.

The transmission methods table represents information including communication protocols, demodulation methods of received radio waves, transfer bit rate, data format and frequencies in association with the abovementioned sensor ID specific to each sensor 100. A sensor ID needs not be represented by the whole of the sensor ID. It may be represented by only a part of the information that can identify a transmission method in a data transfer or information representing the type of the product or the manufacturer's name. This may reduce processing time in extracting a transmission method.

The transmission methods table enables data update including change, addition or deletion of data via the operating unit 208.

The transmission methods table shown in FIG. 4 is designed to identify the difference between transmission methods by the top two digits of a character string forming each sensor ID. Each transmission method is represented in association with a sensor ID as a combination of multiple types of protocol 1-n (n is a natural number of 2 or more), multiple types of demodulation methods (amplitude modulation (AM), amplitude shift keying (ASK), frequency modulation (FM), frequency shift keying (FSK), phase modulation (PM) and phase shift keying (PSK)), multiple types of transfer bit rate 1-n, multiple types of data format 1-n, multiple frequencies f1-fn. The abovementioned communication protocol is information representing a protocol of sending/receiving data with the sensor 100.

The operating unit 208 includes a keyboard with multiple switches, for example. The operating unit 208 is for inputting information for initialization or the ID of the sensor 100.

The switch 209 is for ordering the central processing unit 206 to start initialization.

The display control unit 210 displays a value of the air pressure in each tire 300 in association with an equipped place of each tire 300 on the display 211 based on data input from the central processing unit 206.

The power source unit 212 is supplied with power from a battery mounted on the vehicle, regulates this power to a right voltage for each unit forming the monitor 200 and supplies the power to each unit.

Figure 5:
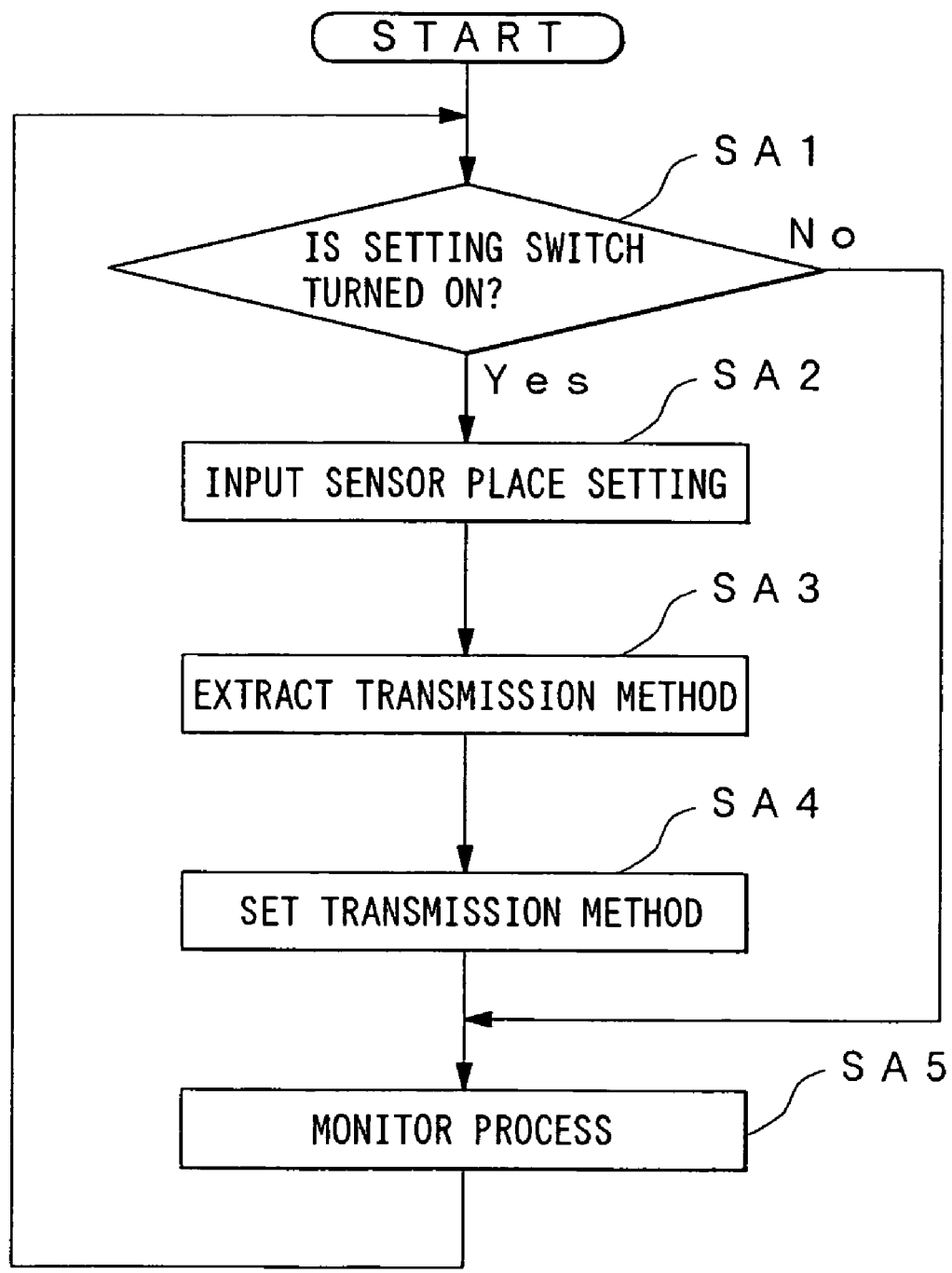
FIG. 5 is a flowchart showing program processing by a monitor of the first embodiment according to the present invention.

Next, an operation of a tire monitoring system with the abovementioned configuration will be described with reference to a flowchart shown in FIG. 5.

In the tire monitoring system of the embodiment, the ID of the sensor 100 in each tire 300 needs to be previously input in the monitor 200 so that the monitor 200 can identify the type of the sensor 100 in each tire 300 in association with the equipped place of the tire 300. For this purpose, it is required to check the ID of the sensor 100 provided for each tire 300, turn on the switch 209 of the monitor 200, input the ID of each sensor 100 and turn off the switch 209 after the input, before the system is used.

In other words, when the central processing unit 206 of the monitor 200 is supplied with driving power and starts the operation, it determines whether the setting switch (switch 209) is turned on or not (SA1). If the switch 209 is turned off, the central processing unit 206 proceeds to a monitor process (SA5) to be described later. If the switch 209 is turned on, the central processing unit 206 performs initialization.

During the initialization, the central processing unit 206 performs a sensor place setting input for importing a sensor ID input from the operating unit 208 in association with an equipped place of the tire 300 (SA2). Then the central processing unit 206 extracts a transmission method corresponding to each sensor ID from a transmission methods table (SA3) and stores information on the extracted transmission method in memory 207 in association with the sensor ID (SA4).

Thereafter, the central processing unit 206 performs the monitor process. In this monitor process, the central processing unit 206 analyzes the received data received from each sensor 100 and stored in the receiving buffer 205. With this analysis, the central processing unit 206 determines a sensor ID included in the received data, obtains detected data, i.e., the air pressure in the tire 300 and displays this on the display 211 via the display control unit 210.

Figure 6:
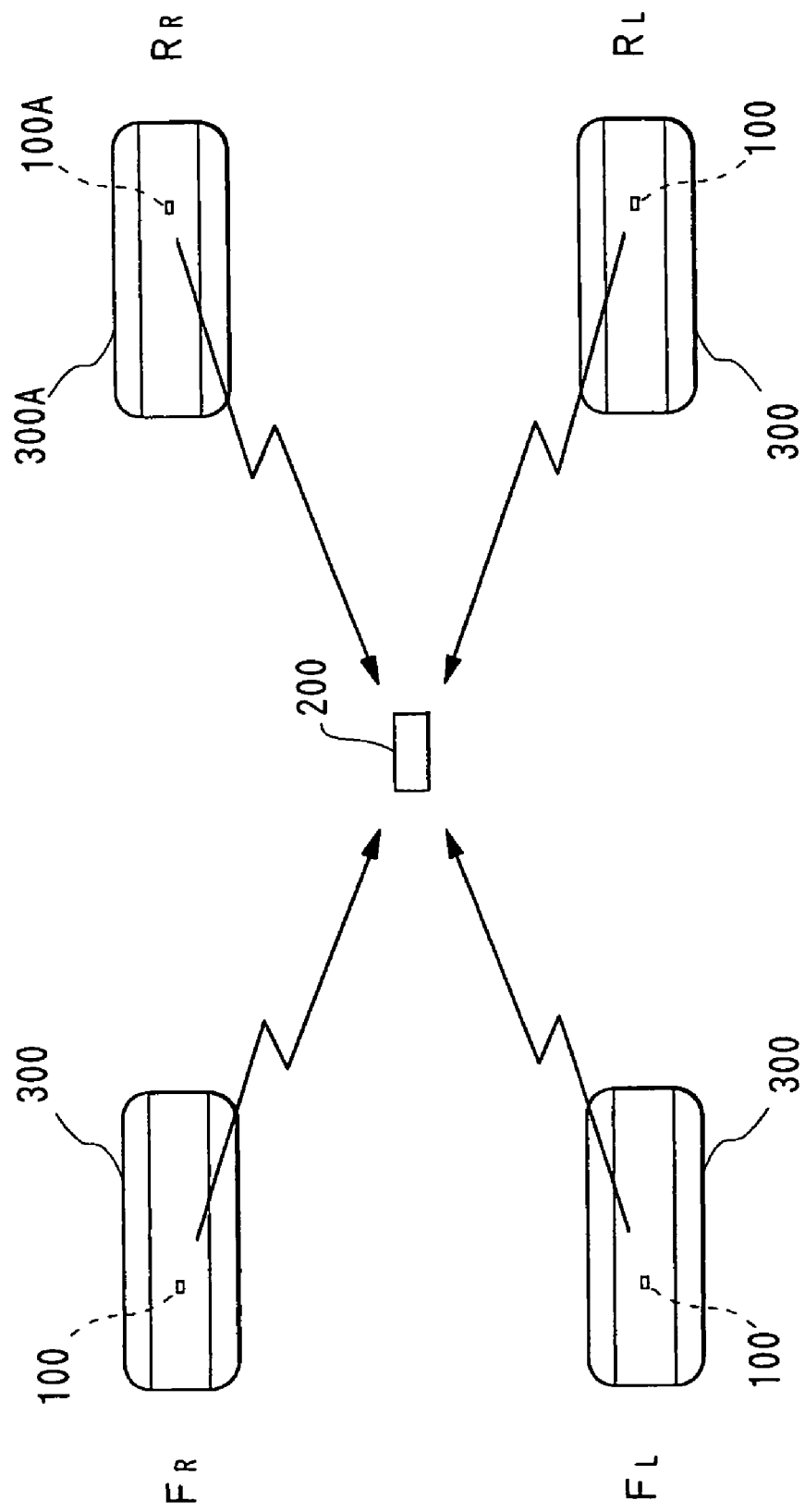
FIG. 6 is a block diagram illustrating a system when a sensor is changed in the first embodiment according to the present invention.

Therefore, in the tire monitoring system with the abovementioned configuration, the monitor 200 has a transmission methods table and the central processing unit 206 can set a transmission method so that the same transmission method is used by each sensor 100 and the monitor 200. At the monitor 200, the central processing unit 206 can set a transmission method for each of the sensors fixed to the respective tires. For example, as shown in FIG. 6, even if only the rear right tire of a vehicle is replaced with a tire 300A provided with another type of sensor 100A, a data communication in the transmission method for the sensor 100A can be made available.

The monitor 200 may be adapted to switch transmission methods in common with all the sensors 100 fixed to the respective tires 300. In other words, the monitor 200 may be adapted to switch transmission methods only when the sensors 100 in all the tires 300 are the same type.

Although the system is adapted to have the sensor 100 only including the air pressure sensor 111 in this embodiment, the system may have the sensor 100 provided with the sensor unit 100, which detects the temperature, the humidity, distortion and the acceleration of the tire 300, for sending the detected value.

If the system employs sensors 100 using frequencies in a completely different frequency bands for transmission as the sensors 100, for example, if the system employs the sensor 100 using a frequency of 315 MHz band for transmission and the sensor 100 using a frequency in 2.45 GHz band for transmission at the same time, the system can respond to the transmission by providing the monitor 200 with a receiving unit supporting different transmission frequency bands and by adding information on a used frequency to the abovementioned transmission methods table.

The system may switch or branch off a single antenna to be shared for the purpose of the antenna 201 for the FM receiving unit 203 and the antenna 202 for the AM receiving unit 204.

It is needless to say that the system can be adapted to include a sending unit or a receiving unit adjusted to modulation methods and demodulation methods other than the abovementioned ones, for example, phase modulation (PM) or phase shift keying (PSK) and switch with a sending unit or a receiving unit for other modulation methods or demodulation methods.

Next, the second embodiment according to the present invention will be described.

Figure 7:
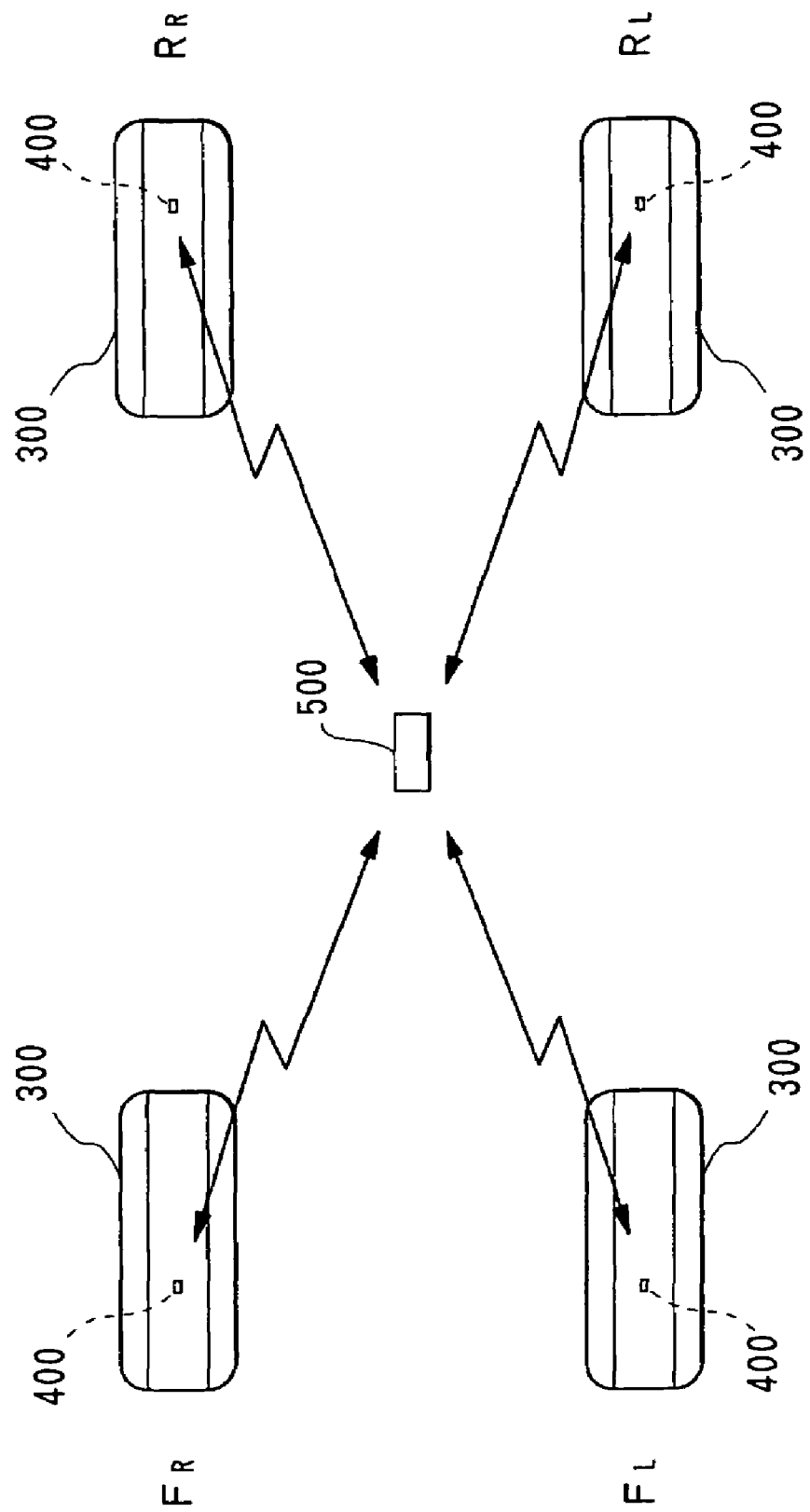
FIG. 7 is a block diagram illustrating a tire monitoring system of the second embodiment according to the present invention.
Figure 8:
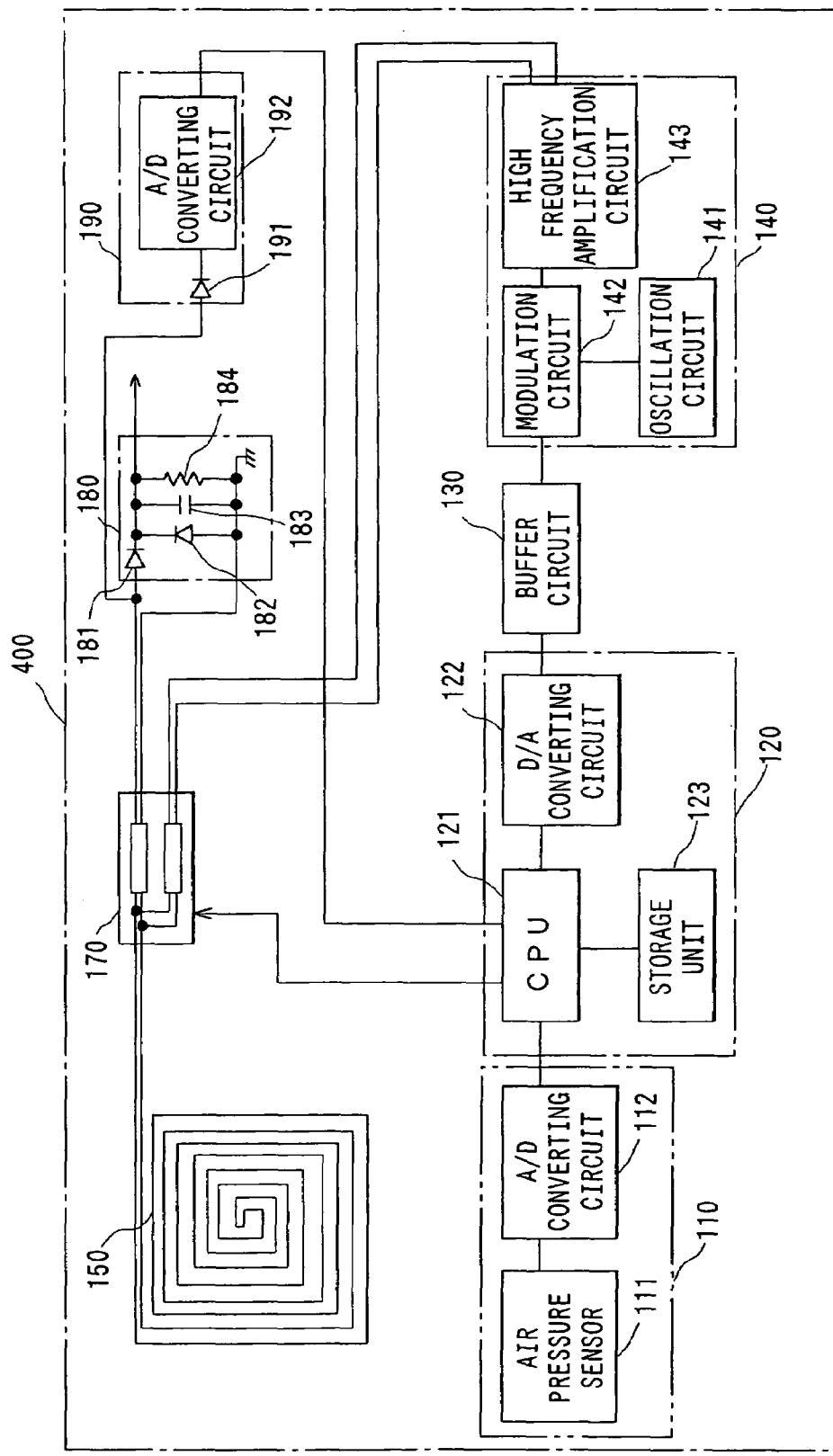
FIG. 8 is a block diagram illustrating an electric circuit of a sensor of the second embodiment according to the present invention.
Figure 9:
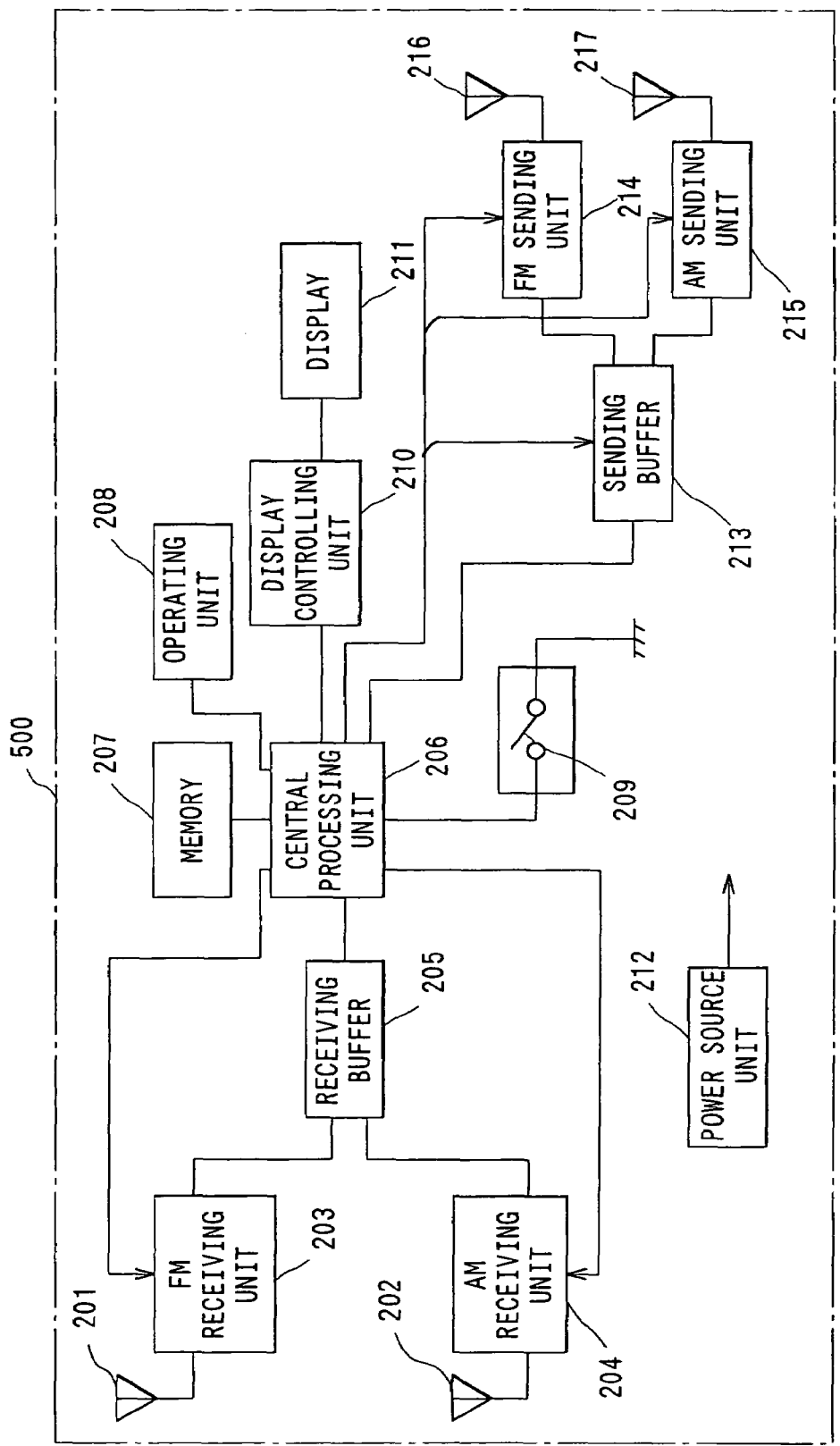
FIG. 9 is a block diagram illustrating an electric circuit of a monitor of the second embodiment according to the present invention.

FIG. 7 is a block diagram illustrating a tire monitoring system of the second embodiment according to the present invention. FIG. 8 is a block diagram illustrating an electric circuit of a sensor of the second embodiment according to the present invention. FIG. 9 is a block diagram illustrating an electric circuit of a monitor of the second embodiment according to the present invention.

In the figures, the same components as those in the abovementioned first embodiment are denoted by the same reference numbers and omitted from the following description. Differences between the second embodiment and the first embodiment are that the second embodiment includes a monitor 500 that enables transmission of radio waves and a passive sensor 400 that receives radio waves sent from monitor 500 and operates on the energy.

In other words, the tire monitoring system of the second embodiment includes the sensor 400 provided for each tire 300 and the monitor 500.

As shown in FIG. 8, the sensor 400 includes a sensor unit 110, a central processing unit 120, a buffer circuit 130, an oscillation unit 140, an antenna 150, an antenna switch 170, a rectification circuit 180 and a detector 190.

The second embodiment is provided with the antenna switch 170, the rectification circuit 180 and the detector 190 in addition to the configuration of the first embodiment.

The antenna switch 170 includes an electronic switch or the like, for example. The antenna switch 170 switches between a connection of the antenna 150 with the rectification circuit 180 and the detector 190 and a connection of the antenna 150 with the oscillation unit 140 under the control of the central processing unit 120.

The rectification circuit 180, including diodes 181, 182, a condenser 183 for smoothing or storage, and a register 184, forms a known full-wave rectification circuit. The antenna 150 is connected to the input side of the rectification circuit 180 via the antenna switch 170. The rectification circuit 180 rectifies a high frequency current induced at the antenna 150 into a direct current and outputs this current as a driving power source of the central processing unit 120, the detector 190, the oscillation unit 140 and the sensor unit 110.

A program stored in the storage unit 123 of the central processing unit 120 is also different from that of the first embodiment. With this program, a CPU 121 of the central processing unit 120 sends a detected result only when a sending request instruction designating its own sensor ID is input from the detector 190.

As shown in FIG. 9, the monitor 500 includes receiving antennas 201, 202, an FM receiving unit 203, an AM receiving unit 204, a receiving buffer 205, a central processing unit 206, memory 207, an operating unit 208, a switch 209, a display control unit 210, a display 211, a power source unit 212, a sending buffer 213, an FM sending unit 214, an AM sending unit 215 and sending antennas 216, 217.

The second embodiment is provided with the sending buffer 213, the FM sending unit 214, the AM sending unit 215 and the sending antennas 216, 217 in addition to the configuration of the first embodiment.

The sending buffer 213 is connected between the central processing unit 206 and the FM sending unit 214, the AM sending unit 215. The sending buffer 213 temporally stores serial digital data representing the abovementioned sending request instruction output from the central processing unit 206 and outputs the data to the FM sending unit 214 or the AM sending unit 215 according to an instruction from the central processing unit 206.

The FM sending unit 214 inputs sending data from the sending buffer 213 according to an instruction from the central processing unit 206 and sends the data in the frequency and the modulation method indicated by the central processing unit 206.

The AM sending unit 215 inputs sending data from the sending buffer 213 according to an instruction from the central processing unit 206 and sends the data in the frequency and the modulation method indicated by the central processing unit 206.

Here, the central processing unit 206 indicates a demodulation method in a transmission methods table as a modulation method to the FM sending unit 214 and the AM sending unit 215.

Data format information in a transmission methods table stored in the memory 207 includes information on data format to be sent by the sensor 400 and received data format that can be received by the sensor 400.

A program stored in the memory 207 for operating the central processing unit 206 is also different from that of the first embodiment. With this program, the central processing unit 206 sends the abovementioned sending request instruction by designating each sensor 400 with a sensor ID in a transmission method corresponding to each sensor 400. Here, the central processing unit 206 generates sending data in a data transfer rate and a data format corresponding to each sensor 400 and outputs the data to the sending buffer 213.

Next, the operation of a tire monitoring system with the abovementioned configuration will be described.

In the tire monitoring system of the second embodiment, the ID of the sensor 400 in each tire 300 needs to be previously input in the monitor 500 so that the monitor 500 can identify the type of the sensor 400 in each tire 300 in association with the equipped place of the tire 300. For this purpose, it is required to check the ID of the sensor 400 provided for each tire 300, turn on the switch 209 of the monitor 500, input the ID of each sensor 400 and turn off the switch 209 after the input, before the system is used.

Figure 10:
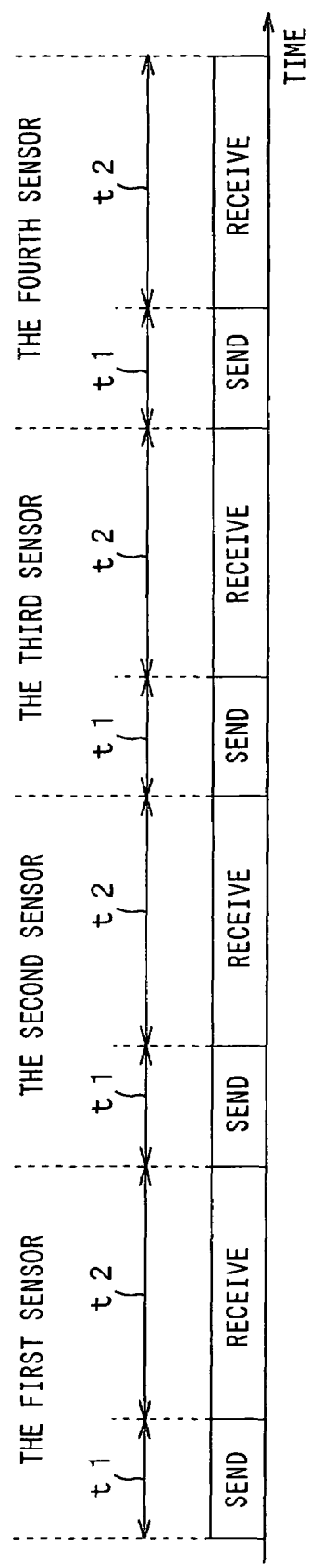
FIG. 10 is a diagram illustrating a time sharing transmission in the second embodiment according to the present invention.

In a monitor process, as shown in FIG. 10, the monitor 500 communicates with the sensors 400 starting at the first sensor and through to the fourth sensor in order. Transmission time t1 from the monitor 500 to the sensor 400 is set to a time for supplying energy enough for driving the sensor 400 and for completely sending the sending request instruction. Receiving time t2 is set to a time for completely receiving data sent from the sensor 400.

Therefore, in the tire monitoring system of the second embodiment, the monitor 500 has a transmission methods table and the central processing unit 206 can set a transmission method so that the same transmission method is used by each sensor 400 and the monitor 500. At the monitor 500, the central processing unit 206 can set a transmission method for each of the sensors fixed to the respective tires. If a tire is replaced with the tire 300 provided with another type of sensor 400, a data communication in the transmission method for the sensor 400 can be made available.

Moreover, the sensor 400 needs no battery. This saves time and effort for servicing such as battery change.

Although the ID of each sensor 400 is previously input to the monitor 500 in association with the equipped place of the tire 300 in the abovementioned second embodiment, the ID of each sensor 400 may be input without being associated with the equipped place of the tire 300 in order only to detect an abnormal event of air pressure without identifying the tire 300.

If only an abnormal event of air pressure needs to be detected, the monitor 500 may also be adapted to automatically detect the ID of each sensor 400. In this case, a program of the sensor 400 is set to send predetermined information including its own sensor ID when it receives a sending request instruction with no ID designated. A program of the monitor 500 is set to send a sending request instruction in each transmission method included in a transmission methods table and obtain the sensor ID of each sensor 400 when the switch 209 is turned on or the monitor 500 starts.

Next, the third embodiment according to the present invention will be described.

Figure 11:
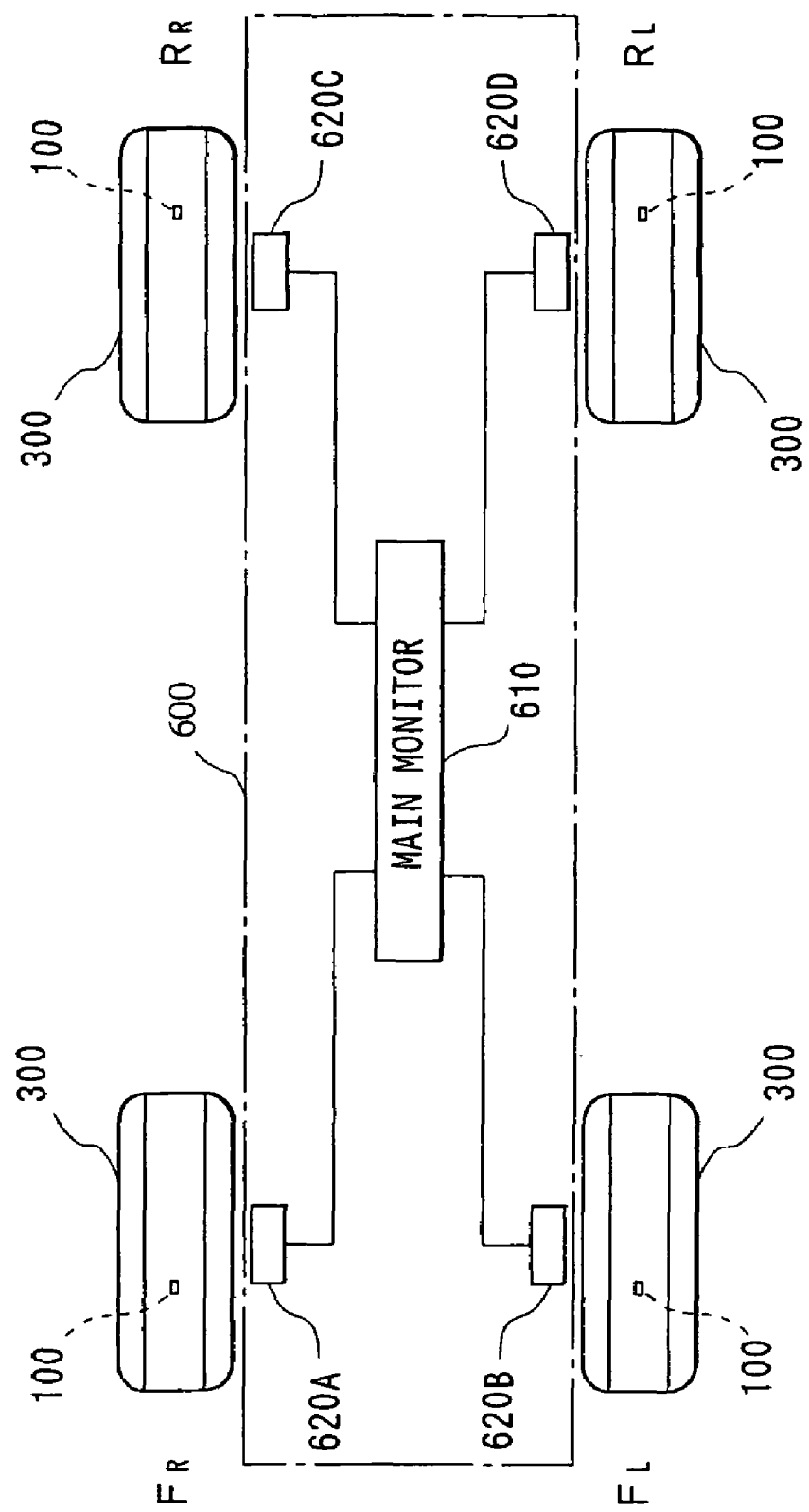
FIG. 11 is a block diagram illustrating a tire monitoring system of the third embodiment according to the present invention.
Figure 12:
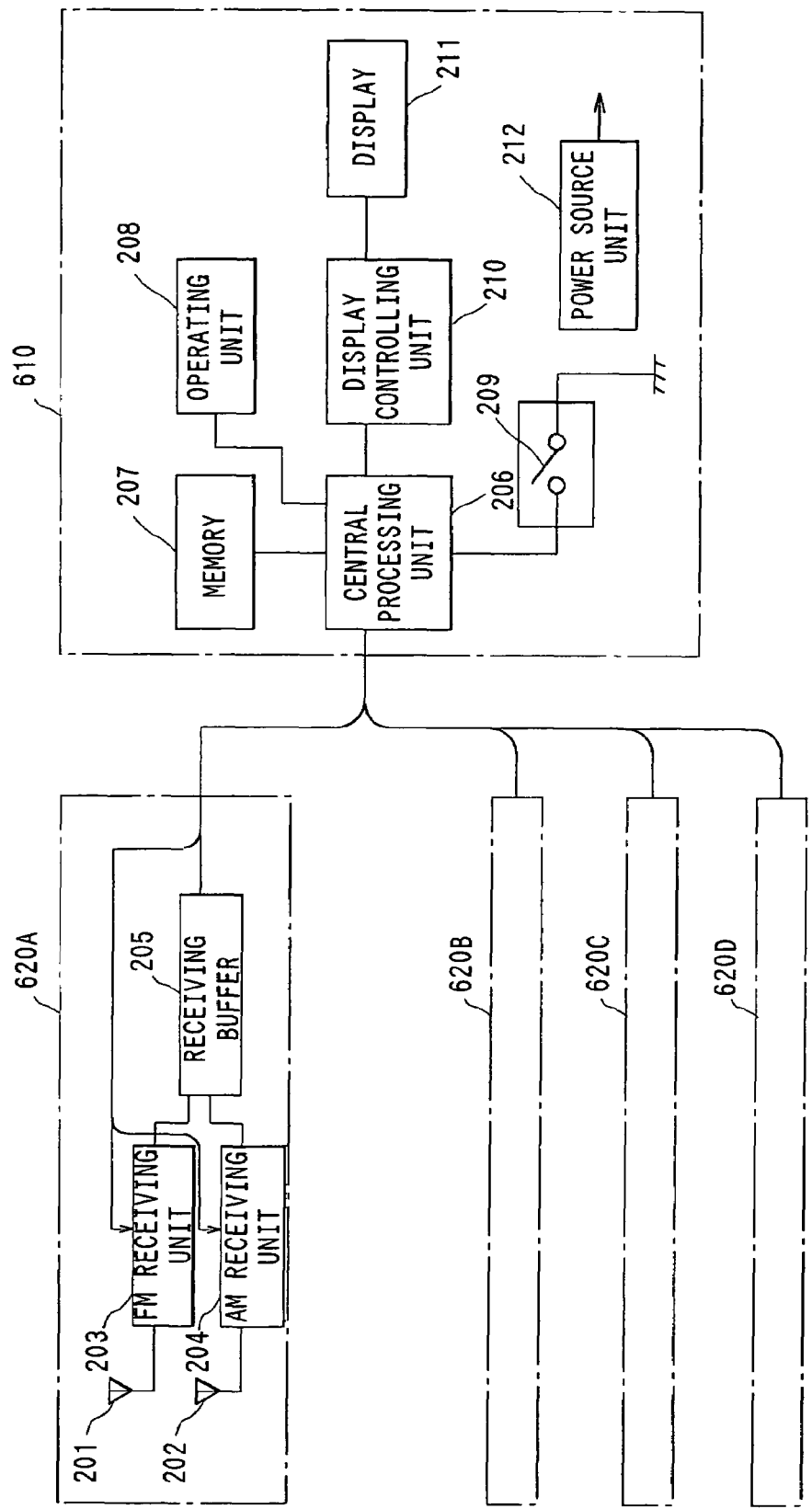
FIG. 12 is a block diagram illustrating an electric circuit of a monitor of the third embodiment according to the present invention.

FIG. 11 is a block diagram illustrating a tire monitoring system of the third embodiment according to the present invention. FIG. 12 is a block diagram illustrating an electric circuit of a monitor of the third embodiment according to the present invention.

In the figures, the same components as those in the abovementioned first embodiment are denoted by the same reference numbers and omitted from the following description. Differences between the third embodiment and the first embodiment are that the third embodiment has a monitor 600 including a main monitor 610 and detecting units 620A-620D provided in association with the respective sensors 100.

Each of detecting units 620A-620D is provided near each tire 300, for example inside a wheel house, and connected to the main monitor 610 via a cable.

The main monitor 610 is placed near the driver seat of the vehicle. The main monitor 610 includes a central processing unit 206, memory 207, an operating unit 208, a switch 209, a display controlling unit 210, a display 211 and a power source unit 212.

Each of detecting units 620A-620D includes antennas 201, 202, an FM receiving unit 203, an AM receiving unit 204 and a receiving buffer 205.

The central processing unit 206 of the main monitor 610 is adapted to output a control signal to each of the detecting units 620A-620D.

The switch 209 on the monitor 600 is formed by a momentary switch. As mentioned later, a program of the central processing unit 206 stored in the memory 207, which is also different from that of the first embodiment, is adapted to recognize the correspondence between each of the detecting units 620A-620D and the tire 300 equipped to each place of the vehicle.

Transmitting power of the sensor 100 is set to a minimum value for radio waves to reach the detecting units 620A-620D provided in association with each sensor 100. Therefore, each of the detecting units 620A-620D receives only radio waves sent from the sensor 100 associated with the unit without receiving any radio wave sent from other sensors 100.

Figure 13:
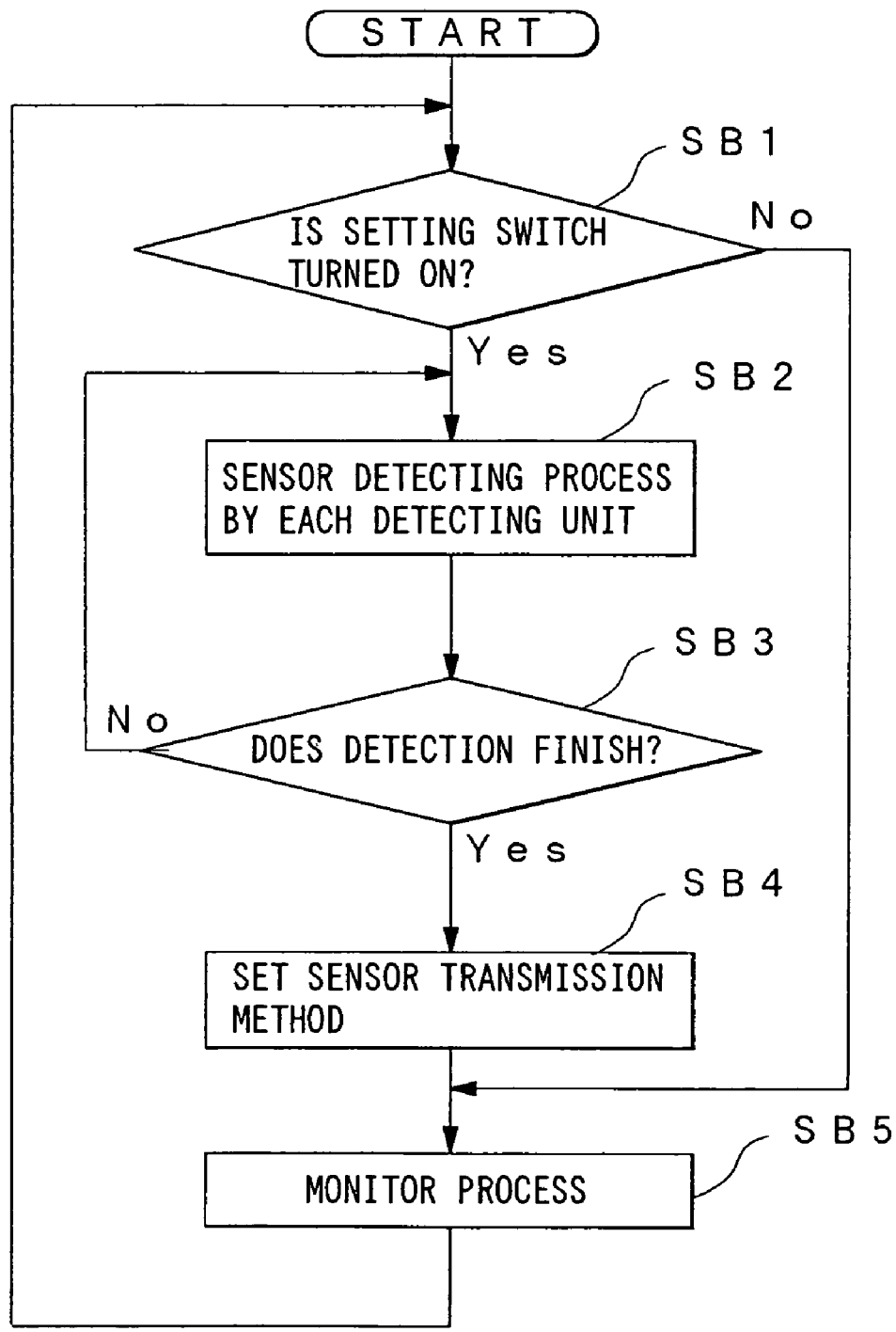
FIG. 13 is a flowchart showing program processing by a monitor of the third embodiment according to the present invention.

Next, the operation of a tire monitoring system with the abovementioned configuration will be described with reference to a flowchart shown in FIG. 13.

Unlike the tire monitoring system according to the first embodiment, the tire monitoring system in this embodiment does not require the ID of each sensor 100 to be checked and input in the monitor 600. The sensor ID of each sensor 400 is imported in the monitor 600 when a driver turns on the switch 209 to start to use the monitor 600 or after changing the tire 300.

In other words, when the monitor 600 is supplied with driving power and starts operating, it keeps monitoring whether the switch 209 is turned on or not (SB1). If the monitor 600 does not detects that the switch 209 is tuned on, it proceeds to SB5 to be described later and performs a monitor process. If the monitor 600 detect that the switch 209 is turned on, it scans all the frequencies that can be received by the FM receiving unit 203 and the AM receiving unit 204 in each of the detecting units 620A-620D, detects radio waves sent form the sensor 100, and determines the transmission method of the sensor 100 corresponding to each of the detecting units 620A-620D. Here, the central processing unit 206 scans by changing demodulation methods in the FM receiving unit 203 and the AM receiving unit 204, sequentially analyzes data stored in the receiving buffer 205. The central processing unit 206 repeats this process until it detects the sensor 100 (SB2, SB3).

Next, the central processing unit 206 stores the ID and the transmission method of the detected sensor 100 in the memory 207 in association with the place where the tire 300 is equipped (SB4).

Thereafter, the central processing unit 206 in the monitor 600 performs a monitor process (SB5). In this monitor process, the central processing unit 206 obtains detected data, i.e., an air pressure value in the tire 300, included in received data received from each sensor 100 and stored in the receiving buffer 205 in each of the detecting units 620A-602D and displays the data on the display 211 via the display control unit 210.

Therefore, in the tire monitoring system of the third embodiment, the monitor 600 has a transmission methods table and the central processing unit 206 can set a transmission method so that the same transmission method is used by each sensor 100 and each of the detecting units 620A-620D in the monitor 600.

At the main monitor 610, the central processing unit 206 automatically sets a transmission method individually for each sensor 100 fixed to each tire 300. If any tire 300 is replaced with another tire 300 provided with a sensor 100 of different type, a data communication with a transmission method of this sensor 100 is automatically made available.

Although the third embodiment is adapted to set a transmission method by detecting the ID of the sensor 100 when a driver or the like turns on the switch 209, the switch 209 may be geared with the starter switch of the vehicle.

Next, the fourth embodiment according to the present invention will be described.

Figure 14:
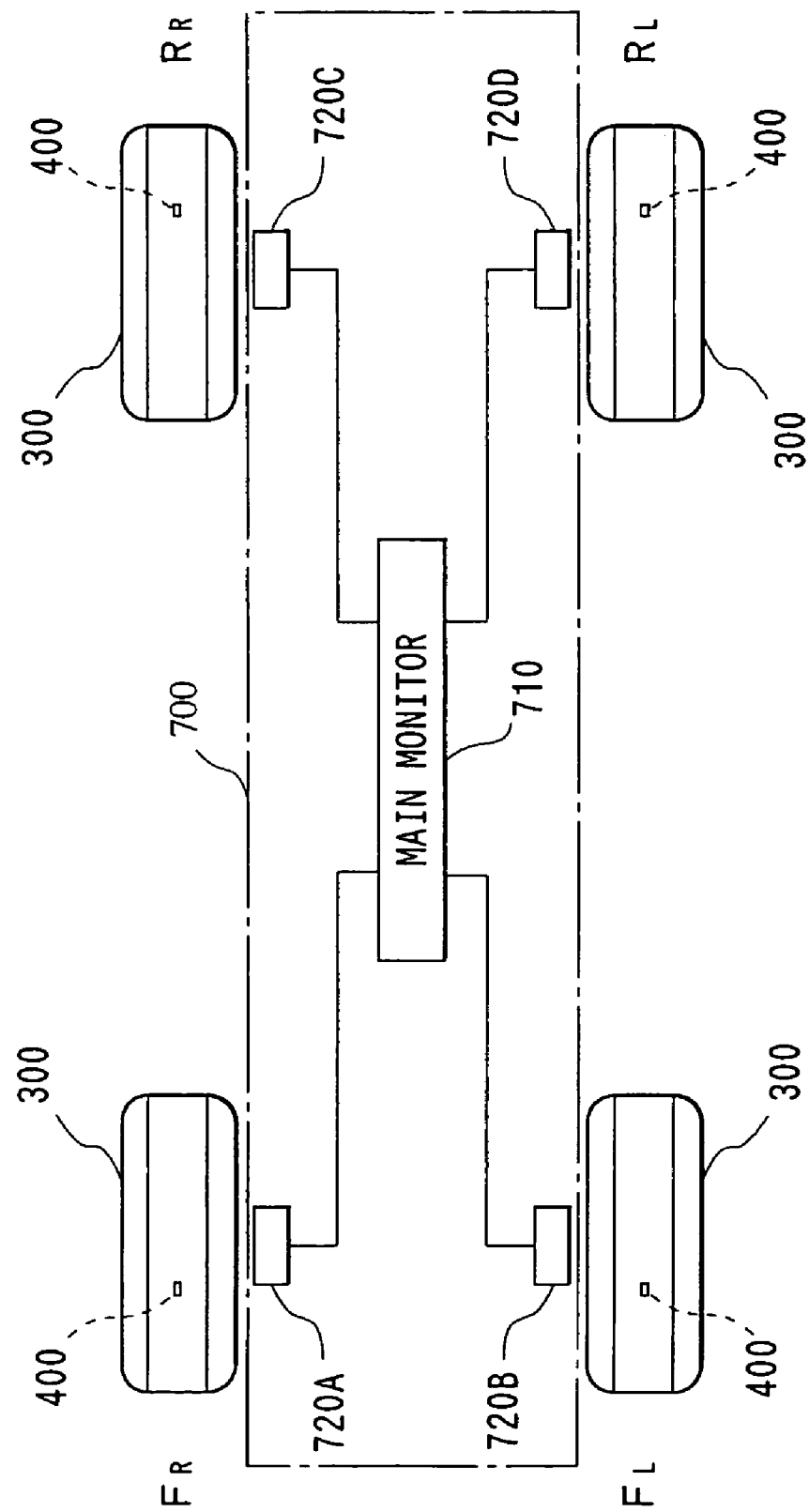
FIG. 14 is a block diagram illustrating a tire monitoring system of the fourth embodiment according to the present invention.
Figure 15:
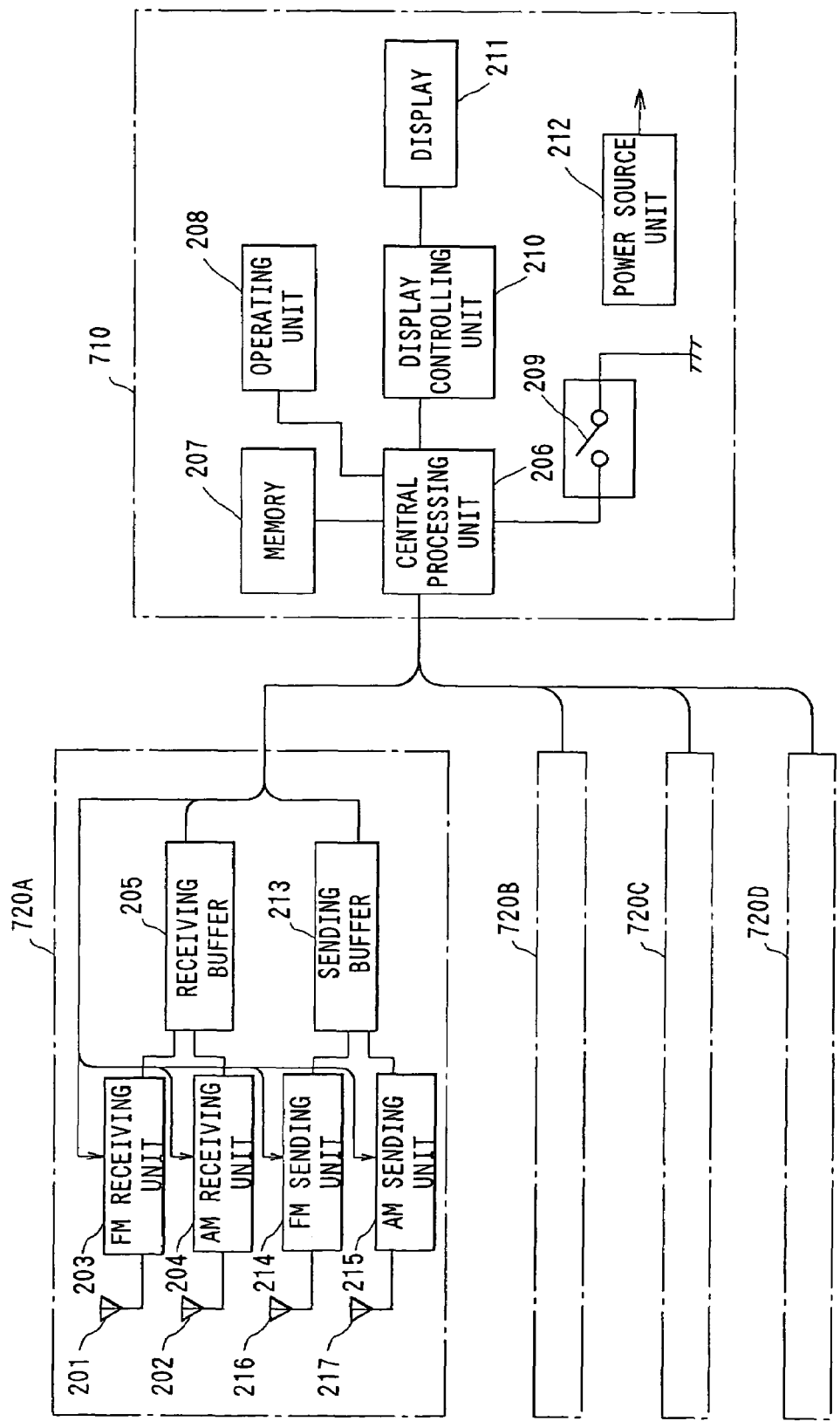
FIG. 15 is a block diagram illustrating an electric circuit of a monitor of the fourth embodiment according to the present invention.

FIG. 14 is a block diagram illustrating a tire monitoring system of the fourth embodiment according to the present invention. FIG. 15 is a block diagram illustrating an electric circuit of a monitor of the fourth embodiment according to the present invention.

In the figures, the same components as those in the abovementioned second embodiment are denoted by the same reference numbers and omitted from the following description. Differences between the fourth embodiment and the second embodiment are that the fourth embodiment has the monitor 700 including the main monitor 710 and the detecting units 720A-720D provided in association with the respective sensors 400.

Each of the detecting units 720A-720D is provided near each tire 300, for example inside a wheel house, and connected to the main monitor 710 via a cable.

The main monitor 710 is placed near the driver seat of the vehicle. The main monitor 710 includes a central processing unit 206, memory 207, an operating unit 208, a switch 209, a display controlling unit 210, a display 211 and a power source unit 212.

Each of the detecting units 720A-720D includes receiving antennas 201, 202, an FM receiving unit 203, an AM receiving unit 204, a receiving buffer 205, an FM sending unit 214, an AM sending unit 215 and sending antennas 216, 217.

The central processing unit 206 of the main monitor 710 is adapted to output a control signal to each of the detecting units 720A-720D.

The switch 209 of the monitor 700 is formed by a momentary switch. As mentioned later, a program of the central processing unit 206 stored in the memory 207, which is also different from that of the second embodiment, is adapted to recognize the correspondence between each of the detecting units 720A-720D and the tire 300 equipped to each place of the vehicle.

Transmitting power of the sensor 400 is set to a minimum value for radio waves to reach the detecting units 720A-720D provided in association with each sensor 400. Therefore, each of the detecting units 720A-720D receives only radio waves sent from the sensor 400 associated with the unit without receiving any radio wave sent from other sensors 400.

Next, the operation of a tire monitoring system of the fourth embodiment will be described.

In the tire monitoring system of the fourth embodiment, the sensor ID of each sensor 400 is imported in the monitor 700 when a driver turns on the switch 209 to start to use the monitor 700 or after changing the tire 300.

When the monitor 700 is supplied with driving power and starts operating, it keeps monitoring whether the switch 209 is turned on or not. If the monitor 700 does not detect that the switch 209 is tuned on, it performs a monitor process to be described later.

In other words, if the monitor 700 detects that the switch 209 is turned on, the central processing unit 206 sends the abovementioned sending request instruction by scanning all the frequencies listed in a transmission methods table by the FM sending unit 214 and the AM sending unit 215 in each of the detecting units 720A-720D, while receiving radio waves of the frequencies sent by the FM receiving unit 203 and the AM receiving unit 204, detecting radio waves sent from the sensor 400 and determining the transmission method of the sensor 400 corresponding to each of the detecting units 720A-720D. Here, the central processing unit 206 scans by changing modulation methods in the FM sending unit 214 and the AM sending unit 215 and demodulation methods in the FM receiving unit 203 and the AM receiving unit 204, sequentially analyzes data stored in the receiving buffer 205. The central processing unit 206 repeats this process until it detects the sensor 400.

Similarly to the monitor process shown in FIG. 10, the monitor 700 communicates with the sensors 400 starting at the first sensor and through to the fourth sensor in order. Transmission time t1 from the monitor 700 to the sensor 400 is set to a time for supplying energy enough for driving the sensor 400 and for completely sending the sending request instruction. Receiving time t2 is set to a time for completely receiving data sent from the sensor 400.

The central processing unit 206 stores the ID and the transmission method of the detected sensor 400 in the memory 207 in association with the place where the tire 300 is equipped.

Thereafter, the central processing unit 206 in the monitor 700 performs a monitor process. In this monitor process, the central processing unit 206 obtains detected data, i.e., an air pressure value in the tire 300, included in received data received from each sensor 400 and stored in the receiving buffer 205 in each of the detecting units 620A-620D and displays the data on the display 211 via the display control unit 210.

Therefore, in the tire monitoring system of the fourth embodiment, the monitor 700 has a transmission methods table and the central processing unit 206 automatically sets a transmission method so that the same transmission method is used by each sensor 400 and the monitor 700. At the monitor 700, the central processing unit 206 individually sets a transmission method for each sensor 400 fixed to each tire 300. If a tire is replaced with the tire 300 provided with another type of sensor 400, a data communication with the transmission method for the sensor 400 is automatically made available.

Moreover, the sensor 400 needs no battery. This saves time and effort in servicing such as battery change.

Although the abovementioned fourth embodiment is adapted to set a transmission method by detecting the ID of the sensor 400 when a driver or the like turns on the switch 209, the switch 209 may be geared with the starter switch of a vehicle and automatically set when the vehicle starts.

Next, the fifth embodiment according to the present invention will be described.

Figure 16:
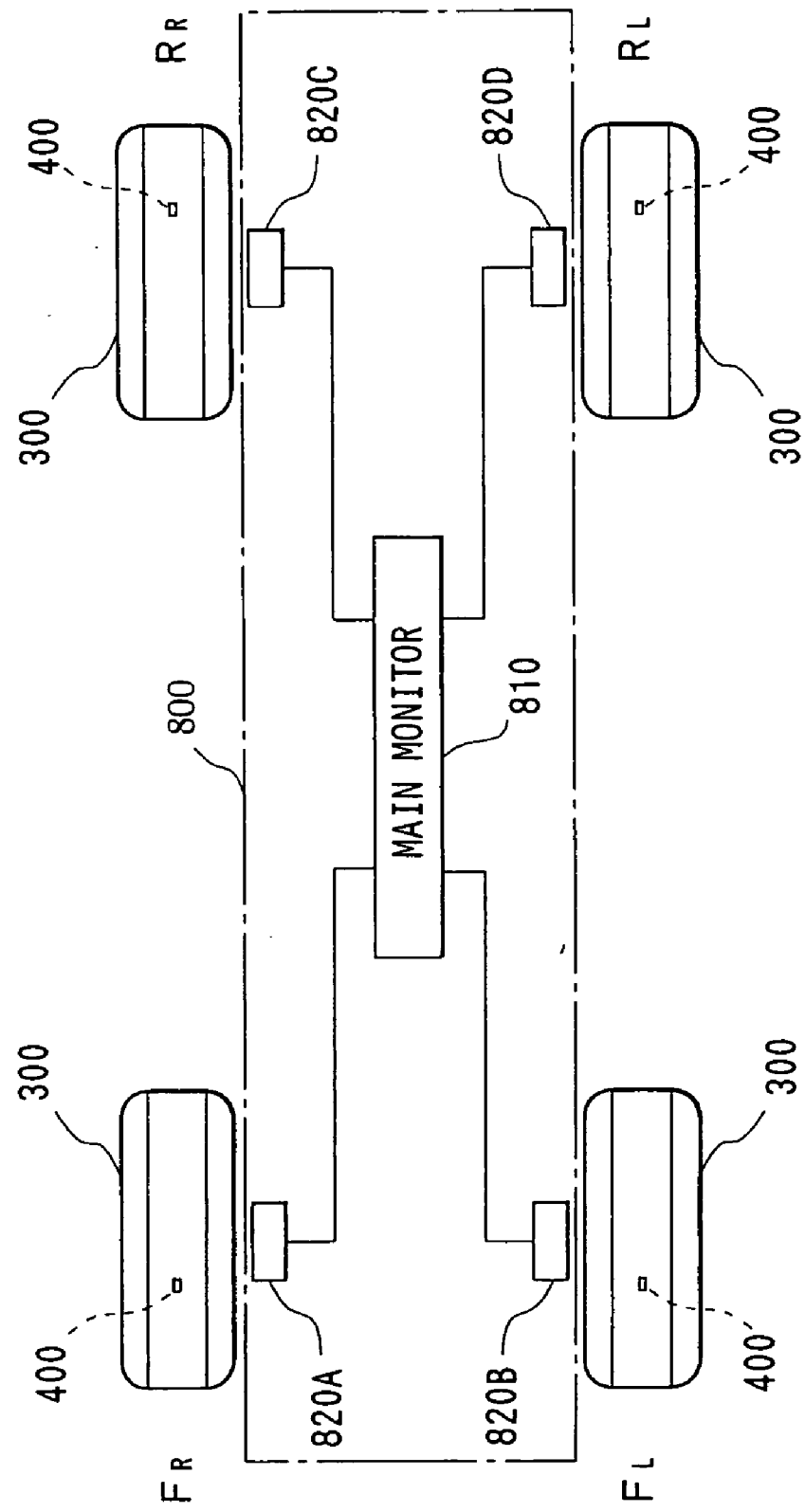
FIG. 16 is a block diagram illustrating a tire monitoring system of the fifth embodiment according to the present invention.

FIG. 16 is a block diagram illustrating a tire monitoring system of the fifth embodiment according to the present invention. FIG. 17 is a block diagram illustrating an electric circuit of a monitor of the fifth embodiment according to the present invention.

In the figures, the same components as those in the abovementioned second embodiment are denoted by the same reference numbers and omitted from the following description. Differences between the fifth embodiment and the second embodiment are that the fifth embodiment has a monitor 800 including a main monitor 810 and antenna units 820A-820D provided in association with respective sensors 400.

Each of the antenna units 820A-820D includes an antenna 821 adjusted to a frequency of radio waves that is available for the main monitor 810 to send and receive. Each of the antenna units 820A-820D is provided near each tire 300, for example inside a wheel house, and connected to the main monitor 810 via a coaxial cable for high frequency.

The main monitor 810 includes an FM receiving unit 203, an AM receiving unit 204, a receiving buffer 205, a central processing unit 206, memory 207, an operating unit 208, a switch 209, a display controlling unit 210, a display 211, a power source unit 212, a sending buffer 213, an FM sending unit 214, an AM sending unit 215 and electronic switches 221-224.

In the electronic switches 221-224, each terminal is connected so that the antenna 821 of any one unit of the antenna units 820A-820D can be connected with any one of the FM receiving unit 203, the AM receiving unit 204, the FM sending unit 214 and the AM sending unit 215 on the basis of a control signal from the central processing unit 206.

In other words, the antenna 821 of any one of the antenna units 820A-820D is selected by an electronic switch 224 with four contacts for each circuit and connected with an armature of an electronic switch 223 with two contacts for each circuit. A contact of the electronic switch 223 is connected with an armature of the electronic switch 221 for switching between connections to the FM receiving unit 203 and the AM receiving unit 204. The other contact of the electronic switch 223 is connected with an armature of the electronic switch 222 for switching between connections to the FM sending unit 214 and the AM sending unit 215.

The central processing unit 206 of the main monitor 810 is adapted to output a switch control signal of the electronic switches 221-224. A program of the central processing unit 206 stored in the memory 207 is a program different from that of the second embodiment and adapted to recognize the correspondence between each of the antenna units 820A-820D and the tire 300 equipped to each place of the vehicle.

Next, the operation of a tire monitoring system of the fifth embodiment will be described.

In the tire monitoring system of the fifth embodiment, the sensor ID of each sensor 400 is imported in the monitor 800 when a driver turns on the switch 209 to start to use the monitor 800 or after changing tire 300.

When the monitor 800 is supplied with driving power and starts operating, it keeps monitoring whether the witch 209 is turned on or not. If the monitor 800 does not detect that the switch 209 is tuned on, it performs a monitor process to be described later.

In other words, if the monitor 800 detects that the switch 209 is turned on, the central processing unit 206 sends the abovementioned sending request instruction by switching the electronic switches 221-224 and scanning all the frequencies listed in a transmission methods table by the FM sending unit 214 and the AM sending unit 215 and receives radio waves of the abovementioned frequency by the FM receiving unit 203 and the AM receiving unit 204.

Here, the central processing unit 206 scans by changing modulation methods in the FM sending unit 214 and the AM sending unit 215 and demodulation methods in the FM receiving unit 203 and the AM receiving unit 204, sequentially analyzes data stored in the receiving buffer 205. The central processing unit 206 repeats this process until it detects the sensor 400.

In this manner, the central processing unit 206 detects radio waves sent from the sensor 400 and determines the transmission method of the sensor 400 corresponding to each of the antenna units 820A-820D.

Similarly to the monitor process shown in FIG. 10, the monitor 800 communicates with the sensor 400 starting at the first sensor and through to the fourth sensor in order. Transmission time t1 from the monitor 800 to the sensor 400 is set to a time for supplying energy enough for driving the sensor 400 and for completely sending the sending request instruction. Receiving time t2 is set to a time for completely receiving data sent from the sensor 400.

Therefore, in the tire monitoring system of the fifth embodiment, the monitor 800 has a transmission methods table and the central processing unit 206 automatically sets a transmission method so that the same transmission method is used by each sensor 400 and the monitor 800. At the monitor 800, the central processing unit 206 individually sets a transmission method for each sensor 400 fixed to each tire 300. If a tire is replaced with a tire 300 provided with another type of sensor 400, a data communication with the transmission method for sensor 400 is automatically made available.

Moreover, the sensor 400 needs no battery. This saves time and effort in servicing such as battery change.

Although the fifth embodiment is adapted to set a transmission method by detecting the ID of the sensor 400 when a driver or the like turns on the switch 209, the switch 209 may be geared with the starter switch of a vehicle and automatically set when the vehicle starts.

Next, the sixth embodiment according to the present invention will be described.

FIG. 18 is a block diagram illustrating an electric circuit of a sensor of the sixth embodiment according to the present invention. A sensor of the sixth embodiment is the sensor of the abovementioned first embodiment added with a transmission methods switch function included in a monitor of the first or fifth embodiment.

In FIG. 18, where the reference number 900 denotes a sensor, the same components as those in the sensor 100 of the abovementioned first embodiment are denoted by the same reference numbers and omitted from the following description.

The sensor 900 in the sixth embodiment includes a sensor unit 110, a central processing unit 901, an operating unit 902, a buffer circuit 130, an AM submitting unit 903, an FM submitting unit 904, sending antennas 905, 906 and a battery 160.

The central processing unit 901 is configured as the central processing unit 120 of the first embodiment. Differences between the central processing unit 901 and that of the first embodiment are that the central processing unit 901 is adapted to output a control signal to the AM submitting unit 903 and the FM submitting unit 904 on the basis of a switch setting in the operating unit 902 including a small dip switch or a rotary switch, and that the central processing unit 901 has a different program for operating a CPU, and that a transmission methods table is stored in a storage unit in the central processing unit 901.

A transmission methods table stored in the central processing unit 901 includes information such as a modulation method, a sending frequency, a data transfer bit rate, and a transferred data format in association with a set value for a switch of the operating unit 902.

The central processing unit 901 switches sending frequencies and modulation methods by inputting detected data by the sensor 110 from the sensor 110 at every predetermined time and outputting a control signal to the AM submitting unit 903 and the FM submitting unit 904 on the basis of a switch setting in operating unit 902 and the abovementioned transmission methods table, generates sending data including the detected data and sends the sending data to a monitor.

The AM submitting unit 903 has the same function as that of AM sending unit 215 of the second embodiment. When AM submitting unit 903 is permitted to send on the basis of a control signal input from the central processing unit 901, it sends sending data input from the buffer circuit 130 in a frequency and a modulation method designated by the central processing unit 901 via the antenna 905.

The FM submitting unit 904 has the same function as that of the FM sending unit 214 of the second embodiment. When the FM submitting unit 904 is permitted to send on the basis of a control signal input from the central processing unit 901, it sends sending data input from the buffer circuit 130 in a frequency and a modulation method designated by the central processing unit 901 via the antenna 906.

The sensor 900 with the abovementioned configuration enables a transmission with a monitor using any of transmission methods listed in the transmission methods table in the abovementioned central processing unit 901, if a switch setting of the operating unit 902 is changed so as to use the same transmission method as that of a monitor mounted on a vehicle when a tire provided with this sensor 900 is equipped to the vehicle or when the tire is manufactured.

Next, the seventh embodiment according to the present invention will be described.

FIG. 19 is a block diagram illustrating an electric circuit of a sensor of the seventh embodiment according to the present invention. A sensor of the seventh embodiment is the sensor of the abovementioned sixth embodiment added with a function for receiving data sent from a monitor.

In FIG. 19, where the reference number 910 denotes a sensor, the same components as those in the sensor 900 of the abovementioned sixth embodiment are denoted by the same reference numbers and omitted from the following description.

The sensor 910 in the seventh embodiment includes a sensor unit 110, a central processing unit 911, an operating unit 902, a buffer circuit for sending 130, an AM submitting unit 903, an FM submitting unit 904, sending antennas 905, 906, a buffer circuit for receiving 912, an AM receiving unit 913, an FM receiving unit 914, receiving antennas 915, 916 and a battery 160.

The central processing unit 911 is configured as the central processing unit 901 of the sixth embodiment. Differences between the central processing unit 911 and that of the sixth embodiment are that the central processing unit 911 is adapted to output a control signal to the AM submitting unit 903, the FM submitting unit 904, the AM receiving unit 913 and the FM receiving unit 914 on the basis of a switch setting in the operating unit 902 including a small dip switch or a rotary switch, and that the central processing unit 911 has a different program for operating a CPU.

The central processing unit 911 sends its own sensor ID on the basis of data input from the buffer circuit for receiving 912, i.e., an instruction received from a monitor by outputting a control signal to the AM submitting unit 903, the FM submitting unit 904, the AM receiving unit 913 and the FM receiving unit 914 on the basis of a switch setting of the operating unit 902 and the abovementioned transmission methods table and switching frequencies for sending and receiving or modulation methods and demodulation methods, and sends sending data including detected data by the sensor unit 110 by inputting the detected data from the sensor 110.

The AM receiving unit 913 has the same function as that of the AM receiving unit 204 of the first embodiment and receives radio waves via the antenna 915. At this moment, the AM receiving unit 913 outputs data received in a frequency and a demodulation method designated by the central processing unit 911 to the buffer circuit 912 on the basis of a control signal input from the central processing unit 911.

The FM receiving unit 914 has the same function as that of FM receiving unit 203 of the first embodiment and receives radio waves via the antenna 916. At this moment, the FM receiving unit 914 outputs data received in a frequency and a demodulation method designated by the central processing unit 911 to the buffer circuit 912 on the basis of a control signal input from the central processing unit 911.

The sensor 910 with the abovementioned configuration enables a transmission with a monitor using any of transmission methods listed in the transmission methods table in the abovementioned central processing unit 911, if a switch setting of the operating unit 902 is changed so as to use the same transmission method as that of a monitor mounted on a vehicle when a tire provided with this sensor 910 is equipped to the vehicle or when the tire is manufactured.

Although the sensor 910 operates on energy from battery 160 in the seventh embodiment, the sensor 910 may operate on electric energy by converting radio wave energy received from a monitor into an electric energy as the sensor 400 does in the second embodiment.

The present invention is not limited to the abovementioned embodiments from the first to the seventh. It is needless to say that systems and devices that are the combinations of the embodiments are also included in the present invention.

Although radio waves are used for a wireless communication between a sensor and a monitor in each of the abovementioned embodiments, the wireless communication is not limited to use radio waves and an optical or supersonic wireless communication is possible.

INDUSTRIAL APPLICABILITY

As mentioned above, the present invention enables conditions of a tire to be monitored if a tire is replaced with another tire fixed with a sensor whose transmission method with the monitor is different from that of the earlier one when the tire is replaced with another tire due to a flat tire or the like.

The invention claimed is:
1. A tire monitoring system comprising:
sensors, each of which is provided for each of the tires equipped to a vehicle and detects conditions of the tire and wirelessly sends the detected result, and
a monitor with a monitor receiver, which receives the detected result sent from each of said sensors, for monitoring conditions of each of said tires on the basis of said detected result received by the monitor receiver;
wherein at least either said sensor or said monitor comprises:
a storage unit for storing more than two types of transmission method information for a data communication between said sensor and said monitor; and
switch means for selecting one type of transmission method information from said stored transmission method information and setting a data communication with a transmission method on the basis of the selected transmission method information available, wherein said transmission method information comprises data transfer bit rate information and transferred data format information.

2. The tire monitoring system according to claim 1, comprising means for carrying out a data communication by using radio waves between said sensors and said monitor,
wherein said switch means has means for switching frequencies of radio waves used in said data communication.

3. The tire monitoring system according to claim 1, wherein said transmission method information comprises at least one type of information of communication protocol information, modulation method information, and demodulation method information.

4. The tire monitoring system according to claim 1, wherein said monitor is provided inside said vehicle.

5. The tire monitoring system according to claim 1, wherein said sensor comprises means for detecting an air pressure in a tire and sending the detected result.

6. A monitor receiver in a tire monitoring system comprising:
sensors, each of which is provided for each of the tires equipped to a vehicle and detects conditions of the tire and wirelessly sends the detected result, and
a monitor with said monitor receiver, which receives the detected result sent from each of said sensors, for monitoring conditions of said tires on the basis of said detected result received by the monitor receiver;
wherein said monitor receiver comprises:
a storage unit for storing more than two types of transmission method information for a data communication with said sensors; and
switch means for selecting one type of transmission method information from said stored transmission method information and setting a data communication with a transmission method on the basis of the selected transmission method information available,
wherein said transmission method information comprises data transfer bit rate information and transferred data format information.

7. The monitor receiver in the tire monitoring system according to claim 6, comprising means for carrying out a data communication by using radio waves with said sensors, wherein said switch means has means for switching frequencies of radio waves used in said data communication.

8. A monitor of a tire monitoring system comprising
sensors, each of which is provided for each of the tires equipped to a vehicle and detects conditions of the tire and wirelessly sends the detected result, and
a monitor with a monitor receiver, which receives the detected result sent from each of said sensors, for monitoring conditions of said tires on the basis of said detected result received by the monitor receiver,
wherein said monitor comprises a monitor receiver as in claim 7.

9. The monitor of the tire monitoring system according to claim 8, comprising means for requesting from said sensor to send said detected result.

10. The monitor receiver in the tire monitoring system according to claim 6, wherein said transmission method information comprises at least either communication protocol information or demodulation method information.

11. A monitor of a tire monitoring system comprising
sensors, each of which is provided for each of the tires equipped to a vehicle and detects conditions of the tire and wirelessly sends the detected result, and
a monitor with a monitor receiver, which receives the detected result sent from each of said sensors, for monitoring conditions of said tires on the basis of said detected result received by the monitor receiver,
wherein said monitor comprises a monitor receiver as in claim 10.

12. The monitor of the tire monitoring system according to claim 11, comprising means for requesting from said sensor to send said detected result.

13. The monitor receiver in the tire monitoring system according to claim 6, comprising means for displaying at least a part of data received from said sensor.

14. A monitor of a tire monitoring system comprising
sensors, each of which is provided for each of the tires equipped to a vehicle and detects conditions of the tire and wirelessly sends the detected result, and
a monitor with a monitor receiver, which receives the detected result sent from each of said sensors, for monitoring conditions of said tires on the basis of said detected result received by the monitor receiver,
wherein said monitor comprises a monitor receiver as in claim 13.

15. The monitor of the tire monitoring system according to claim 14, comprising means for requesting from said sensor to send said detected result.

16. The monitor receiver in the tire monitoring system according to claim 6, wherein said switch means comprises means for selecting one type of transmission method information from said more than two types of transmission method information and setting a data communication with a transmission method based on the selected transmission method information available, individually for each of the sensors.

17. A monitor of a tire monitoring system comprising
sensors, each of which is provided for each of the tires equipped to a vehicle and detects conditions of the tire and wireles sly sends the detected result, and
a monitor with a monitor receiver, which receives the detected result sent from each of said sensors, for monitoring conditions of said tires on the basis of said detected result received by the monitor receiver,
wherein said monitor comprises a monitor receiver as in claim 16.

18. The monitor of the tire monitoring system according to claim 17, comprising means for requesting from said sensor to send said detected result.

19. The monitor receiver in the tire monitoring system according to claim 6, comprising communication means for carrying out a data communication in a time sharing method with each of said sensors,
wherein said switch means comprises means for setting one of said transmission methods available individually for a transmission time for each of said time-sharing sensors.

20. A monitor of a tire monitoring system comprising
sensors, each of which is provided for each of the tires equipped to a vehicle and detects conditions of the tire and wirelessly sends the detected result, and
a monitor with a monitor receiver, which receives the detected result sent from each of said sensors, for monitoring conditions of said tires on the basis of said detected result received by the monitor receiver,
wherein said monitor comprises a monitor receiver as in claim 19.

21. The monitor of the tire monitoring system according to claim 20, comprising means for requesting from said sensor to send said detected result.

22. The monitor receiver in the tire monitoring system according to claim 7, wherein said switch means comprises:
a control unit for setting a data communication with a transmission method on the basis of transmission method information stored in said storage unit available;
means for receiving data sent from said sensor with any of more than two types of demodulation methods on the basis of an instruction from said control unit; and
a switch for switching said control unit to the default state when a sensor is changed,
wherein said control unit comprises means for receiving data sent from said sensor by switching said more than two demodulation methods one after the other in said default state and for setting a transmission method available by automatically determining a transmission method corresponding to said sensor on the basis of predetermined information in the received data.

23. The monitor receiver in the tire monitoring system according to claim 22, wherein said storage unit stores information representing the type of a sensor and transmission method information in sensor's own identification information sent by the sensor in association with each other,
wherein said control unit comprises means for automatically determining a transmission method corresponding to said sensor on the basis of sensor's identification information included in data received from said sensor.

24. A monitor of a tire monitoring system comprising
sensors, each of which is provided for each of the tires equipped to a vehicle and detects conditions of the tire and wirelessly sends the detected result, and
a monitor with a monitor receiver, which receives the detected result sent from each of said sensors, for monitoring conditions of said tires on the basis of said detected result received by the monitor receiver,
wherein said monitor comprises a monitor receiver as in claim 23.

25. The monitor of the tire monitoring system according to claim 24, comprising means for requesting from said sensor to send said detected result.

26. The monitor receiver in the tire monitoring system according to claim 22, wherein, comprising at least two or more of amplitude modulation (AM), amplitude shift keying (ASK), frequency modulation (FM), frequency shift keying (FSK), phase modulation (PM) and phase shift keying (PSK) as said demodulation method.

27. A monitor of a tire monitoring system comprising
sensors, each of which is provided for each of the tires equipped to a vehicle and detects conditions of the tire and wirelessly sends the detected result, and
a monitor with a monitor receiver, which receives the detected result sent from each of said sensors, for monitoring conditions of said tires on the basis of said detected result received by the monitor receiver,
wherein said monitor comprises a monitor receiver as in claim 26.

28. The monitor of the tire monitoring system according to claim 27, comprising means for requesting from said sensor to send said detected result.

29. A monitor of a tire monitoring system comprising
sensors, each of which is provided for each of the tires equipped to a vehicle and detects conditions of the tire and wirelessly sends the detected result, and
a monitor with a monitor receiver, which receives the detected result sent from each of said sensors, for monitoring conditions of said tires on the basis of said detected result received by the monitor receiver,
wherein said monitor comprises a monitor receiver as in claim 22.

30. The monitor of the tire monitoring system according to claim 29, comprising means for requesting from said sensor to send said detected result.

31. A monitor of a tire monitoring system comprising
sensors, each of which is provided for each of the tires equipped to a vehicle and detects conditions of the tire and wirelessly sends the detected result, and
a monitor with a monitor receiver, which receives the detected result sent from each of said sensors, for monitoring conditions of said tires on the basis of said detected result received by the monitor receiver,
wherein said monitor comprises a monitor receiver as in claim 6.

32. The monitor of the tire monitoring system according to claim 31, comprising means for requesting from said sensor to send said detected result.

33. A monitor receiver in a tire monitoring system comprising:
sensors, each of which is provided for each of the tires equipped to a vehicle and detects conditions of the tire and wirelessly sends the detected result, and
a monitor with said monitor receiver, which receives the detected result sent from each of said sensors, for monitoring conditions of said tires on the basis of said detected result received by the monitor receiver;
wherein said monitor receiver comprises:
a storage unit for storing more than two types of transmission method information for a data communication with said sensors; and
switch means for selecting one type of transmission method information from said stored transmission method information and setting a data communication with a transmission method on the basis of the selected transmission method information available,
wherein said switch means comprises means for selecting one type of transmission method information from said more than two types of transmission method information and setting a data communication with a transmission method based on the selected transmission method information available, individually for each of the sensors.

34. A monitor of a tire monitoring system comprising
sensors, each of which is provided for each of the tires equipped to a vehicle and detects conditions of the tire and wirelessly sends the detected result, and
a monitor with a monitor receiver, which receives the detected result sent from each of said sensors, for monitoring conditions of said tires on the basis of said detected result received by the monitor receiver,
wherein said monitor comprises a monitor receiver as in claim 33.

35. The monitor of the tire monitoring system according to claim 34, comprising means for requesting from said sensor to send said detected result.

36. A monitor receiver in a tire monitoring system comprising:
sensors, each of which is provided for each of the tires equipped to a vehicle and detects conditions of the tire and wirelessly sends the detected result, and
a monitor with said monitor receiver, which receives the detected result sent from each of said sensors, for monitoring conditions of said tires on the basis of said detected result received by the monitor receiver;
wherein said monitor receiver comprises:

a storage unit for storing more than two types of transmission method information for a data communication with said sensors;
switch means for selecting one type of transmission method information from said stored transmission method information and setting a data communication with a transmission method on the basis of the selected transmission method information available; and
communication means for carrying out a data communication in a time sharing method with each of said sensors,
wherein said switch means comprises means for setting one of said transmission methods available individually for a transmission time for each of said time-sharing sensors.

37. A monitor of a tire monitoring system comprising
sensors, each of which is provided for each of the tires equipped to a vehicle and detects conditions of the tire and wirelessly sends the detected result, and
a monitor with a monitor receiver, which receives the detected result sent from each of said sensors, for monitoring conditions of said tires on the basis of said detected result received by the monitor receiver,
wherein said monitor comprises a monitor receiver as in claim 36.

38. The monitor of the tire monitoring system according to claim 37, comprising means for requesting from said sensor to send said detected result.

39. A monitor receiver in a tire monitoring system comprising:
sensors, each of which is provided for each of the tires equipped to a vehicle and detects conditions of the tire and wirelessly sends the detected result, and
a monitor with said monitor receiver, which receives the detected result sent from each of said sensors, for monitoring conditions of said tires on the basis of said detected result received by the monitor receiver;
wherein said monitor receiver comprises:
a storage unit for storing more than two types of transmission method information for a data communication with said sensors;
switch means for selecting one type of transmission method information from said stored transmission method information and setting a data communication with a transmission method on the basis of the selected transmission method information available,
wherein said switch means comprises:
a control unit for setting a data communication with a transmission method on the basis of transmission method information stored in said storage unit available;
means for receiving data sent from said sensor with any of more than two types of demodulation methods on the basis of an instruction from said control unit; and
a switch for switching said control unit to the default state when a sensor is changed,
wherein said control unit comprises means for receiving data sent from said sensor by switching said more than two demodulation methods one after the other in said default state and for setting a transmission method available by automatically determining a transmission method corresponding to said sensor on the basis of predetermined information in the received data.

40. The monitor receiver in the tire monitoring system according to claim 39,
wherein said storage unit stores information representing the type of a sensor and transmission method information in sensor's own identification information sent by the sensor in association with each other,
wherein said control unit comprises means for automatically determining a transmission method corresponding to said sensor on the basis of sensor's identification information included in data received from said sensor.

41. A monitor of a tire monitoring system comprising
sensors, each of which is provided for each of the tires equipped to a vehicle and detects conditions of the tire and wirelessly sends the detected result, and
a monitor with a monitor receiver, which receives the detected result sent from each of said sensors, for monitoring conditions of said tires on the basis of said detected result received by the monitor receiver,
wherein said monitor comprises a monitor receiver as in claim 40.

42. The monitor of the tire monitoring system according to claim 41, comprising means for requesting from said sensor to send said detected result.

43. The monitor receiver in the tire monitoring system according to claim 39, comprising at least two or more of amplitude modulation (AM), amplitude shift keying (ASK), frequency modulation (FM), frequency shift keying (FSK), phase modulation (PM) and phase shift keying (PSK) as said demodulation method.

44. A monitor of a tire monitoring system comprising
sensors, each of which is provided for each of the tires equipped to a vehicle and detects conditions of the tire and wirelessly sends the detected result, and
a monitor with a monitor receiver, which receives the detected result sent from each of said sensors, for monitoring conditions of said tires on the basis of said detected result received by the monitor receiver,
wherein said monitor comprises a monitor receiver as in claim 43.

45. The monitor of the tire monitoring system according to claim 44, comprising means for requesting from said sensor to send said detected result.

46. A monitor of a tire monitoring system comprising
sensors, each of which is provided for each of the tires equipped to a vehicle and detects conditions of the tire and wirelessly sends the detected result, and
a monitor with a monitor receiver, which receives the detected result sent from each of said sensors, for monitoring conditions of said tires on the basis of said detected result received by the monitor receiver,
wherein said monitor comprises a monitor receiver as in claim 39.

47. The monitor of the tire monitoring system according to claim 46, comprising means for requesting from said sensor to send said detected result.

48. A sensor of a tire monitoring system comprising:
sensors, each of which is provided for each of the tires equipped to a vehicle and detects conditions of the tire and wirelessly sends the detected result, and
a monitor with a monitor receiver, which receives the detected result sent from each of said sensors, for monitoring conditions of said tires on the basis of said detected result received by the monitor receiver,
wherein said sensors comprises:
a storage unit for storing more than two types of transmission method information for a data communication with said monitor; and
switch means for selecting one type of transmission method information from transmission method information stored in said storage unit and setting a data communication with a transmission method on the basis of the selected transmission method information available, wherein said transmission method information comprises data transfer bit rate information and transferred data format information.

49. The sensor of the tire monitoring system according to claim 48, comprising means for carrying out a data communication with said monitor by using radio waves.

50. The sensor of the tire monitoring system according to claim 48, wherein said transmission method information comprises at least either communication protocol information or modulation method information.

51. The sensor of the tire monitoring system according to claim 48, comprising means for detecting an air pressure in a tire and sending the detected result.

* * * * *